US012583989B2

(12) United States Patent
Atkinson et al.

(10) Patent No.: US 12,583,989 B2
(45) Date of Patent: Mar. 24, 2026

(54) BIODEGRADABLE COMPOSITIONS AND ARTICLES FORMED THEREFROM

(71) Applicant: Eastman Chemical Company, Kingsport, TN (US)

(72) Inventors: Paul Michael Atkinson, Kingsport, TN (US); Michael Eugene Donelson, Kingsport, TN (US); Xiaobo Hu, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 278 days.

(21) Appl. No.: 18/558,216

(22) PCT Filed: Jun. 28, 2022

(86) PCT No.: PCT/US2022/035222
§ 371 (c)(1),
(2) Date: Oct. 31, 2023

(87) PCT Pub. No.: WO2023/278378
PCT Pub. Date: Jan. 5, 2023

(65) Prior Publication Data
US 2024/0228823 A1      Jul. 11, 2024

Related U.S. Application Data

(60) Provisional application No. 63/202,854, filed on Jun. 28, 2021.

(51) Int. Cl.
*C08J 9/00*        (2006.01)
*B65D 3/22*        (2006.01)
(Continued)

(52) U.S. Cl.
CPC .............. *C08J 9/0061* (2013.01); *B65D 3/22* (2013.01); *C08J 5/18* (2013.01); *C08J 9/20* (2013.01);
(Continued)

(58) Field of Classification Search
CPC ..... C08J 9/0061; C08J 5/18; C08J 9/20; C08J 2203/12; C08J 2203/14; C08J 2301/14;
(Continued)

(56) References Cited

U.S. PATENT DOCUMENTS 3,340,123 A    9/1967  Osmon, Jr.
5,929,229 A    7/1999  Edgar et al.
(Continued)

FOREIGN PATENT DOCUMENTS

WO      WO 2019/207204 A1    10/2019
WO      WO 2021/079025 A1    4/2021

OTHER PUBLICATIONS

Co-pending U.S. Appl. No. 18/558,380, filed Nov. 1, 2023; Atkinson et al.
(Continued)

*Primary Examiner* — Michael C Miggins
(74) *Attorney, Agent, or Firm* — Polly C. Owen; Judith C. Rawis

(57)        ABSTRACT

A biodegradable composition is disclosed. The biodegradable composition includes (i) a biodegradable polymer and (ii) a cellulose ester. Films that include or are formed from the biodegradable composition, as well as articles that include a substrate and a layer of the biodegradable composition on a surface thereof, are also described.

19 Claims, 2 Drawing Sheets

(51) Int. Cl.

| | |
|---|---|
| *C08J 5/18* | (2006.01) |
| *C08J 9/20* | (2006.01) |
| *C08L 1/14* | (2006.01) |
| *C08L 67/02* | (2006.01) |
| *C09D 101/14* | (2006.01) |
| *C09D 167/02* | (2006.01) |
| *D21H 19/28* | (2006.01) |
| *D21H 19/34* | (2006.01) |

(52) U.S. Cl.
CPC ................. *C08L 1/14* (2013.01); *C08L 67/02* (2013.01); *C09D 101/14* (2013.01); *C09D 167/02* (2013.01); *D21H 19/28* (2013.01); *D21H 19/34* (2013.01); *C08J 2203/12* (2013.01); *C08J 2203/14* (2013.01); *C08J 2301/14* (2013.01); *C08J 2367/02* (2013.01); *C08J 2401/14* (2013.01); *C08J 2467/02* (2013.01); *C08J 2467/04* (2013.01); *C08J 2467/06* (2013.01); *C08L 2201/06* (2013.01); *C08L 2203/12* (2013.01); *C08L 2203/16* (2013.01); *C08L 2205/24* (2013.01)

(58) Field of Classification Search
CPC ............... C08J 2367/02; C08J 2401/14; C08J 2467/02; C08J 2467/04; C08J 2467/06; C08J 9/141; B65D 3/22; C08L 67/02; C08L 2201/06; C08L 2203/12; C08L 2203/16; C08L 2205/24; C08L 67/04; C09D 101/14; C09D 167/02; C09D 167/04; C08B 3/16; D21H 19/28; D21H 19/34

See application file for complete search history.

(56) References Cited

U.S. PATENT DOCUMENTS

| | | | |
|---|---|---|---|
| 6,201,034 | B1 | 3/2001 | Warzelhan et al. |
| 8,604,156 | B2 | 12/2013 | Kamikawa et al. |
| 9,150,006 | B2 | 10/2015 | Neill et al. |
| 10,065,404 | B2 | 9/2018 | Neill et al. |
| 2013/0040125 | A1 | 2/2013 | Eberstaller et al. |
| 2020/0399446 | A1 | 12/2020 | An et al. |

OTHER PUBLICATIONS

Notification of Transmittal of the International Search Report and the Written Opinion of the International Searching Authority, or the Declaration received in International Application No. PCT/US2022/035222 with date of mailing Oct. 17, 2022.
Notification of Transmittal of the International Search Report and the Written Opinion of the International Searching Authority, or the Declaration received in International Application No. PCT/US2022/035224 with date of mailing Oct. 24, 2022.
Krevelen, Van; "Calorimetric properties"; Properties of Polymers, 3rd edition; Elesvier (1990), pp. 109-127.

(A)

(B)

(C)

BIODEGRADABLE COMPOSITIONS AND ARTICLES FORMED THEREFROM

CROSS-REFERENCE TO RELATED APPLICATION(S)

This application is a national stage filing under 35 USC § 371 of International Application Number PCT/US2022/035222, filed on, Jun. 28, 2022 which claims the benefit of the filing date to U.S. Provisional Application No. 63/202,854, filed on Jun. 28, 2021, the entire disclosures of which are incorporated by reference herein.

FIELD OF THE INVENTION

The present application discloses biodegradable compositions as well as films, coatings, coating layers and coated articles and objects as such as cast, molded, extruded, profiled and laminated objects formed from said compositions.

BACKGROUND OF THE INVENTION

Plastic and polymer formulations serve an essential role in the manufacture of countless products useful across a wide variety of market applications. The popularity of such formulations is due in significant part to their "tunability", wherein a diverse palette of components and ingredients can be combined and/or blended in various proportions to create a final composition that meets performance criteria for an intended individual end-use application while also having manufacturing, handling, packaging, cost and other characteristics desired by each party along the value chain, from formulators to manufacturers to consumers.

One challenge for those skilled in the art of polymer formulations is to carefully manage and balance these various performance criteria and characteristics. In one example, it is known in the art to blend various fillers into polymers to for example improve and increase stiffness as a function of thickness. Many fillers may, however, reduce visual clarity of the formulation as an unacceptable side-effect and also tend to embrittle the polymer and accelerate crystallization.

Polymer blending is another tool available to a formulator to establish and balance what are sometimes competing characteristics, properties and end-use performance criteria. In some applications, stiffness is required and be achieved by blending of polymers to achieve increased modulus. The ability to tune thermal behavior through polymer blending, such as by altering crystallization behavior and glass transition, can make a material more amorphous, which can in turn improve toughness (and (reduced breakage in end-use) or modify adhesion to other substrates. In addition, altering the stretching behavior is a desired goal for some applications such as fiber spinning, foams, and oriented films. Crystallinity levels in blends can influence the ability of the materials to stretch at certain temperatures and can also be tuned to meet desired characteristics.

Formulation processing can be modified by altering formulation rheology. Some blends may be designed to increase flow behavior at lower temperatures, whereas other blends can be designed to have improved melt strength. Improved melt strength may be beneficial to processes like blown film, extrusion blow molding, extrusion coating or profile extrusion where relatively higher flow may be beneficial to processes like injection molding or fiber spinning.

One or ordinary skill will recognize that a number of factors relating to the individual components of these formulations as well as their interaction in the bland influence not only the achievement of performance criteria but also the overall usefulness of the blend. For example, the molecular weight of each component in a blend may influence blend viscosity, with the amount of component generally correlating to which component is dominant and which is modifying the other. Further, miscibility and compatibility of the polymer components in the blend polymer blend is often critical to performance and may be essential to utility.

In today's economy, commercial success of plastic and polymer formulations can be influenced by if not predicated upon their building blocks and the influence of those building blocks on the environment. Ideally, plastics and plastics formulations can be made from renewable, bio-based resources as well as be recyclable or biodegradable at the end of their life cycle. Evaluation of a material's environmental impact is the subject of many industry and governmental standards and regulations, as exemplified by ASTM D6866-21 which provides Standard Test Methods for Determining the Biobased Content of Solid, Liquid, and Gaseous Samples Using Radiocarbon Analysis.

From a marketing standpoint, consumers are attracted to products made from biodegradable materials. Industries and governmental authorities have developed testing protocols, standards and related certifications to establish minimum set points for a materials' ability to degrade generally; in certain environments such as marine and soil; and/or in certain settings such as home and industrial. Biodegradability presents a particular challenge for the polymer blend formulator, as the nature and characteristic of each and every individual component as well as their interrelationship can play a role in the end determination.

A continuing need exists for polymer formulations and compositions that can satisfy and wide variety of consumer and manufacturer performance criteria while also satisfying biodegradability expectations and standards.

SUMMARY OF THE INVENTION

The present application discloses a biodegradable composition, wherein the composition comprises:

(a) a cellulose ester which is a cellulose acetate propionate ("CAP"); and (b) a biodegradable polymer which is a polyester, wherein the polyester is chosen from poly(butylene succinate) ("PBS"), poly(butylene succinate adipate) ("PBSA"), polycaprolactone ("PCL"), poly(butylene adipate terephthalate) ("PBAT"), polylactic acid ("PLA") or combinations thereof, wherein the CAP has an average degree of substitution for hydroxyl substituents that is from 0.3 to 1.2, an average degree of substitution for the acetyl substituents ("$DS_{Ac}$") that is from 0 to 0.5, an average degree of substitution for the propionyl substituents ("$DS_{Pr}$") that is from 1.3 to 2.5, and a ball drop viscosity of from 0.1 to 30 seconds as measured according to ASTM D-1343, wherein the CAP is present at from 1 wt % to 34 wt % based on the total weight of the cellulose ester and the biodegradable polymer, wherein the composition has a glass transition temperature ("$T_g$") of from −60 to −10° C., a melting temperature ("$T_m$") of from 60 to 130° C., a crystallization temperature ("$T_C$") of from 20 to 85° C., and a viscosity reduction of at least 20° C. measured at 180 to 230° C. as compared to the biodegradable polymer.

The present application discloses films, fibers, molded objects, paper, paperboards made with the biodegradable compositions disclosed herein.

BRIEF DESCRIPTION OF THE FIGURES

Embodiments of the present application are described herein with reference to the figures, wherein.

DETAILED DESCRIPTION

Figure 1:
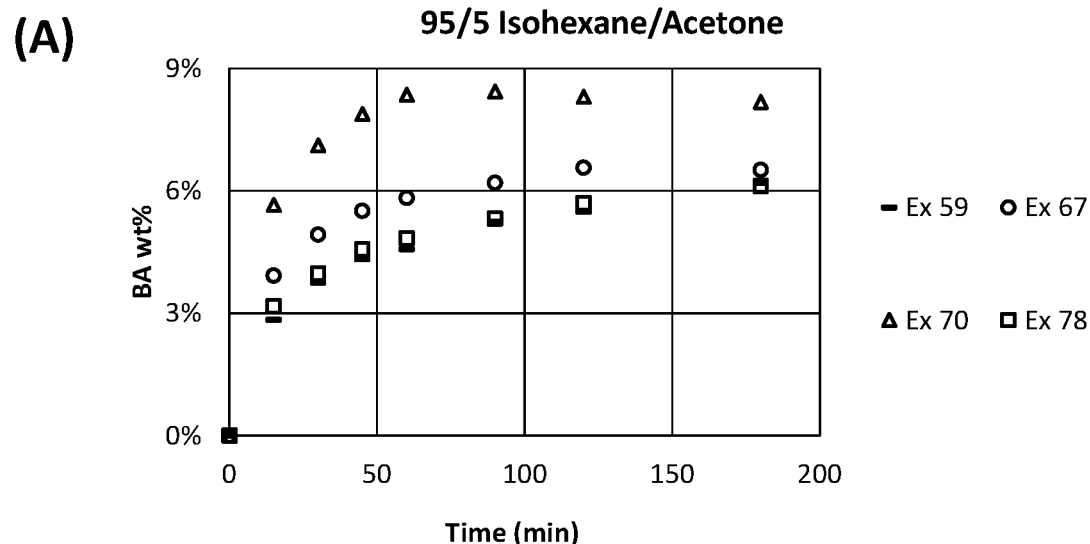
FIG. 1 depicts cellulose ester and cellulose ester blend absorption curves for blowing agent blends containing (A) 95/5 isohexane/acetone, (B) 98/2 isohexane/ethanol, and (C) 95/5 isohexane/ethyl formate.
Figure 1:
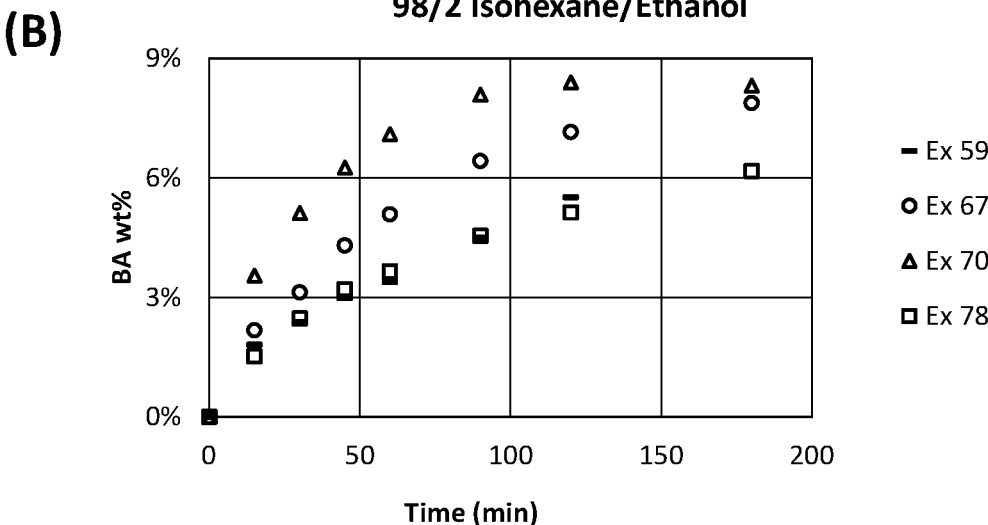
Figure 1:
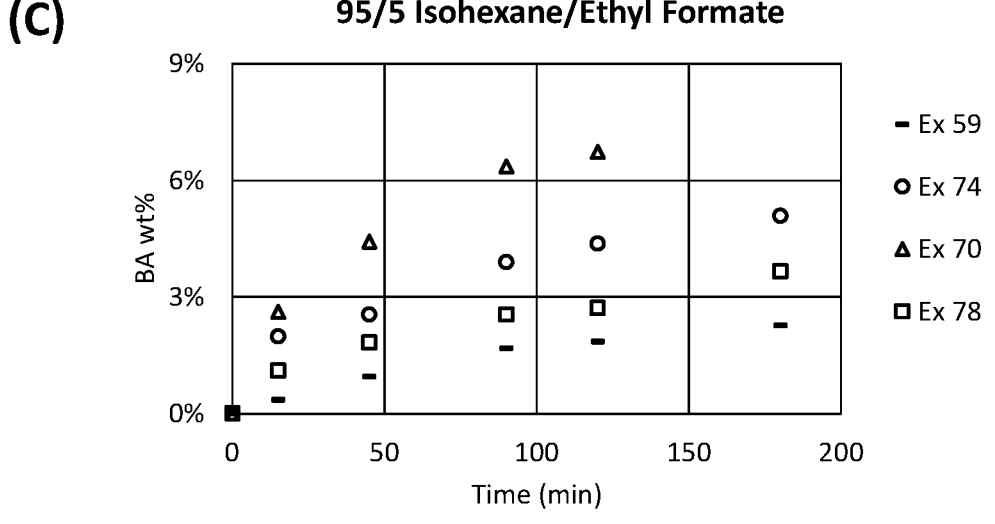

The present application is directed to a biodegradable composition that includes (i) a biodegradable polymer and (ii) a cellulose ester. The term "biodegradable", as used herein, is intended to describe materials (including for example polymers, compositions and objects and articles formed therefrom) that are capable of being decomposed by bacteria, fungi or other living organisms over time. Though not limited thereto, the term biodegradable may include materials that are classified as biodegradable according to one or more standardized test methods such as ASTM D5338. Though not limited thereto, the term biodegradable may further describe materials that a meet one or more specified descriptors or criteria used in the art to evaluate the environmental impact of a materials such as for example soil degradable, water degradable, marine degradable, home compostable, industrial compostable and the like. In one embodiment or in combination with any other embodiment, the biodegradable compositions, objects and coated articles of the present application may be classified or certified as one or more of soil degradable, water degradable, marine degradable, home compostable and industrial compostable when tested according to one or more of ISO 17556, ISO 14851, ASTM D6691, NF T-51-800 and NF T-51-800, and ASTM D6400, respectively. Testing protocols, standards and criteria for such classification or certification generally can vary by type of classification, jurisdiction and the like.

In one embodiment or in combination with any other embodiment, the present application also discloses a biodegradable composition, wherein the composition comprises: (a) a cellulose ester which is a cellulose acetate propionate ("CAP"); and (b) a biodegradable polymer which is a polyester, wherein the polyester is chosen from poly(butylene succinate) ("PBS"), poly(butylene succinate adipate) ("PBSA"), polycaprolactone ("PCL"), poly(butylene adipate terephthalate) ("PBAT"), polylactic acid ("PLA") or combinations thereof, wherein the CAP has an average degree of substitution for hydroxyl substituents that is from 0.3 to 1.2, an average degree of substitution for the acetyl substituents ("$DS_{Ac}$") that is from 0 to 0.5, an average degree of substitution for the propionyl substituents ("$DS_{Pr}$") that is from 1.3 to 2.5, and a ball drop viscosity of from 0.1 to 30 seconds as measured according to ASTM D-1343, wherein the CAP is present at from 1 wt % to 34 wt % based on the total weight of the cellulose ester and the biodegradable polymer, wherein the composition has a glass transition temperature ("$T_g$") of from −60 to −10° C., a melting temperature ("$T_m$") of from 60 to 130° C., a crystallization temperature ("$T_C$") of from 20 to 85° C., and a viscosity reduction of at least 20° C. measured at 180 to 230° C. as compared to the biodegradable polymer.

As is recognized by one skilled in the art, said polyester designated as PBS, PBSA, PCL, PBAT, or PLA each comprises essentially the monomer(s) as denoted, but it does not exclude the presence of other monomers in a minor amount, such as, for example, an amount less than 5%, less than 4%, less than 3%, less than 2%, or less than 1%.

In one embodiment or in combination with any other embodiment, a foamable composition comprising: (a) a cellulose ester which is a cellulose acetate propionate ("CAP"); (b) a biodegradable polymer which is a polyester; and (c) a blowing agent, wherein the polyester is chosen from poly(butylene succinate) ("PBS"), poly(butylene succinate adipate) ("PBSA"), polycaprolactone ("PCL"), poly (butylene adipate terephthalate) ("PBAT"), or combinations thereof, wherein the polyester is present at from 1 wt % to 30 wt % based on the total weight of the cellulose ester and the biodegradable polymer, wherein the CAP has an average degree of substitution for hydroxyl substituents that is from 0.3 to 1.2, an average degree of substitution for the acetyl substituents ("$DS_{Ac}$") that is from 0 to 0.5, an average degree of substitution for the propionyl substituents ("$DS_{Pr}$") that is from 1.3 to 2.5, and a ball drop viscosity of from 0.1 to 30 as measured according to ASTM D-1343, wherein the composition has a reduced blowing agent diffusion of at least 10% as compared to the composition without the biodegradable polymer.

In one embodiment or in combination with any other embodiment, the CAP has a ball drop viscosity of from 0.1 to 0.4 second, or 0.1 to 1 second, or 0.1 to 5 seconds, or 0.1 to 10 seconds, or 0.1 to 20 seconds as measured according to ASTM D-1343.

In one embodiment or in combination with any other embodiment, the CAP is present at from 1 wt % to 18 wt %, or 1 wt % to 20 wt %, or 1 wt % to 25 wt %, or 1 wt % to 30 wt %, or 1 wt % to 15 wt %, or 1 wt % to 10 wt %, or 18 wt % to 34 wt %, or 15 wt % to 35 wt %, or 20 wt % to 345 wt %, or 25 wt % to 34 wt %, 16 wt % to 30 wt %, or 70 wt % to 85 wt %, or 65 wt % to 85 wt %, or from 70 wt % to 85 wt %, or 75 wt % to 85 wt %, or 80 wt % to 85 wt %, or from 70 wt % to 99 wt %, or from 80 wt % to 99 wt %, or from 85 wt % to 99 wt %, or from 90 wt % to 99 wt %, %, based on the total weight of the cellulose ester and the biodegradable polymer.

The biodegradable compositions of the present application include a biodegradable polymer, which is sometimes referred to in the art as a biopolymer. In one embodiment or in combination with any other embodiment, the biodegradable polymer is a polyester. The term "polyester" as used herein is intended to generally include polymers that are typically prepared by reacting a difunctional carboxylic acid or its ester, often a dicarboxylic acid, or mixtures of such acids or esters, with a difunctional hydroxyl compound, often a diol or glycol, or mixtures of such diols or glycols. Alternatively, the difunctional carboxylic acid may be a hydroxy carboxylic acid and the difunctional hydroxyl compound may be an aromatic nucleus bearing 2 hydroxyl substituents such as, for example, hydroquinone. The term polyesters as utilized herein is meant to include homopolymers, copolymers, terpolymers and the like as well as blends or combinations thereof.

In one embodiment or in combination with any other embodiment, the polyester includes aliphatic repeat units. The phrase "aliphatic repeat units" is intended to describe repeat units in which carbon atoms form open chains (as in the alkanes) or cyclic structures but not aromatic rings. Non-limiting examples of aliphatic repeat units include repeat units based on butylene adipate and butylene succinate. The polyester of the present application may consist essentially of or consist of aliphatic repeat units such that it may be described in some embodiments as an aliphatic polyester or aliphatic copolyester. In one embodiment or in combination with any other embodiment, the polyester is selected from the group consisting of poly(butylene adipate) and poly(butylene succinate) polymers and copolymers and blends or combinations thereof. In one embodiment or in combination with any other embodiment, the polyester is a poly(butylene succinate) homopolymer or copolymer.

In one embodiment or in combination with any other embodiment, the polyester may further include aromatic repeat units. The phrase "aromatic repeat units" is intended to describe repeat units that contain one or more rings with pi electrons delocalized all the way around them. Non-limiting examples include repeat units based on butylene terephthalate and butylene isophthalate. In one or more embodiments, the polyester may include from 40 to 50 mol % aromatic repeat units. In one embodiment or in combination with any other embodiment, the polyester is selected from the group consisting of poly(butylene adipate terephthalate) and poly(butylene succinate terephthalate) copolymers and blends or combinations thereof.

Suitable polyesters are described for example in U.S. Pat. Nos. 6,201,034 and 8,604,156, the contents and disclosure of which are incorporated herein by reference, and also are commercially available for example from Ecoworld, PTTMCC or BASF under trade names that include Bio-PBS and Ecoflex.

In one embodiment or in combination with any other embodiment, the biodegradable polymer is present in the biodegradable composition in an amount of from 1 wt % to 99 wt %, or 1 wt % to 90 wt %, or 1 wt % to 80 wt %, or 1 wt % to 70 wt %, or 1 wt % to 60 wt %, or 1 wt % to 50 wt %, or 1 wt % to 40 wt %, or 1 wt % to 30 wt %, or 1 wt % to 25 wt %, or 1 wt % to 20 wt %, or 1 wt % to 15 wt %, or 1 wt % to 10 wt %, or 1 wt % to 5 wt %, 5 wt % to 30 wt %, or 10 wt % to 30 wt %, or 16 wt % to 30 wt %, based on the total weight of the cellulose ester and the biodegradable polymer. In one embodiment or in combination with any other embodiment, the biodegradable polymer is present in amount of at least 50 wt %, based on the total weight of the cellulose ester and the biodegradable polymer. One of ordinary skill will appreciate that the amount of biodegradable polymer in the composition may be varied based on a variety number of factors, including without limitation desired composition target properties such as crystallization, toughness, elongation, adhesion, modulus melt strength and the like.

The biodegradable compositions of the present application includes a cellulose ester. A cellulose ester is generally defined to include cellulose esters of one or more carboxylic acids and are described for example in U.S. Pat. No. 5,929,229, assigned to the assignee of the present application, the contents and disclosure of which are incorporated herein by reference. Non limiting examples of cellulose esters include cellulose acetate, cellulose propionate, cellulose butyrate, so-called mixed acid esters such as cellulose acetate propionate and cellulose acetate, and combinations thereof. In one embodiment or in combination with any other embodiment, the cellulose ester is chosen from the group consisting of cellulose acetate, cellulose acetate propionate, or cellulose acetate butyrate and combinations thereof. In one or more embodiments, the cellulose ester includes, consists essentially of or consists of cellulose acetate propionate. In one embodiment or in combination with any other embodiment, the cellulose ester includes, consists essentially of or consists of cellulose acetate propionate that has a DS OH (hydroxyl degree of substitution) of from 0.3 to 1.2 or 0.4 to 1.2 or 0.4 to 1.0; a DS Ac (acetate degree of substitution) of 0 to 0.5 or 0 to 0.4; a DS Pr (propionate degree of substitution) of from 1.3 to 2.5 or 1.6 to 2.5 or 2.1 to 2.5; and a ball drop viscosity measured according to ASTM D-1343 of from 0.05 to 30 or 0.1 to 20 or 0.2 to 20 or 0.1 to 10. In one embodiment or in combination with any other embodiment, the cellulose ester includes, consists essentially of or consists of cellulose acetate propionate that has a DS OH=0.8, a DS Ac=0.1, DS Pr=2.1 and a ball drop viscosity measured according to ASTM D-1343 of 0.2 seconds.

In one embodiment or in combination with any other embodiment, the cellulose ester includes, consists essentially of or consists of cellulose acetate. In one embodiment or in combination with any other embodiment, the cellulose ester includes, consists essentially of or consists of cellulose acetate that has a ball drop viscosity as measured according to ASTM D-1343 of from 0.1 to 30 or 0.5 to 30 or 2 to 30; a DS Ac of from 1.8 to 2.6 or from 2.1 to 2.6; and a DS OH of from 0.4 to 1.2 or from 0.4 to 0.9. In one embodiment or in combination with any other embodiment, the cellulose acetate may have a DS Ac of 2.45 and a DS OH of 0.55.

The cellulose ester may be present in the biodegradable composition in an amount of from 1% to 99% by weight based on the total weight of the cellulose ester and the biodegradable polymer. In one embodiment or in combination with any other embodiment, the cellulose ester is present in amount of at least 50 wt %, based on the total weight of the cellulose ester and the biodegradable polymer. One of ordinary skill will appreciate that the amount of cellulose ester in the biodegradable composition may be varied based on a variety number of factors, including without limitation desired composition target properties such as crystallization, toughness, elongation, adhesion, modulus melt strength and the like. In one embodiment or in combination with any other embodiment, the cellulose ester is present in an amount of at least 50 wt %, based on the total weight of the cellulose ester and the biodegradable polymer n. In one embodiment or in combination with any other embodiment, the cellulose ester is present in an amount of up to 70% by weight based on the total weight of the cellulose ester and the biodegradable polymer. In one embodiment or in combination with any other embodiment, the cellulose ester is present in an amount of up to 60 wt %, based on the total weight of the cellulose ester and the biodegradable polymer. In one embodiment or in combination with any other embodiment, the cellulose ester is present in the biodegradable composition in an amount of up to 30% by weight based on the total weight of the cellulose ester and the biodegradable polymer or up to 20% by weight based on the total weight of the cellulose ester and the biodegradable polymer or up to 10% by weight based on the total weight of the cellulose ester and the biodegradable polymer.

The biodegradable compositions of the present application can be based on either polyester (i.e., biodegradable polymer) as the major component and cellulose ester as a modifier or cellulose ester as the major component and polyester as a modifier.

The present inventors have unexpected discovered that polyester modified with cellulose ester can increase glass transition temperature (Tg) and lower thermo transition temperatures such as melting temperature (Tm) and crystallization temperature (Tc). It has been found that lower Tc can improve the adhesion of the coatings thus prepared to the substrates. Additionally, the present inventors have also found that the blends thus prepared have a reduced viscosity as compared to the polyester itself. The reduced viscosity is desirable as it can increase the line speed of the extrusion process and also improve the adhesion of the coatings thus prepared to the substrates.

The present inventors have also unexpected discovered that cellulose ester modified with polyester can improve the foamability of cellulose ester. Cellulose esters such as cellulose acetate propionates (CAP) offer advantages such as higher heat deflection temperature during use and biodegradability. However, they have high glass transition temperature and are challenging and, in some cases, impossible to foam using conventional polystyrene foaming equipment because their $T_g$s are higher than the maximum process temperature allowed by the equipment. This invention discloses blend compositions that reduce the $T_g$ of CAPs.

Another issue with foaming CAP is that it has low compatibility with the conventional blowing agent such as pentane, hexane, isopentane and isopentane. During blowing agent (BA) absorption study, CAPs absorb only ~1% of conventional BAs, which is far lower than the 6 wt % BA loading level appropriate for expansion foaming. Additionally, CAP by itself doesn't retain BAs well and BA diffusion from film is too high due to the poor compatibility with conventional BA. If the BA diffuse from polymer beads too fast during pre-foaming, and that there is insufficient BA left in the foam beads, the foam beads are prone to shrinkage and collapse due to the low internal pressure. The foam beads can also have issues with bead-to bead-fusion and part shrinkage, warpage and collapse in the following part forming step. We found that using the combination of CAP blends and selected BA mix, we can reduce the BA diffusion by up to 65%.

The expansion foaming process uses pressurized steam as a heat source, which means the polymers are exposed to moisture during foaming. The absorption of moisture during the foaming process is problematic because water is effective in plasticizing cellulose esters, which significantly suppresses its glass transition temperature and melt viscosity. The foam with lower melt strength is more prone to shrinkage and collapse. We discovered that the addition of biopolymer to CE also reduced moisture absorption.

In one embodiment or in combination with any other embodiment, the biodegradable compositions of the present application includes a biodegradable polymer selected from the group consisting of poly(butylene succinate) homopolymer and copolymers and blends or combinations thereof and up to 20% by weight or up to 10% by weight based on the total weight of the composition of a cellulose acetate propionate that has a DS OH=0.8, a DS Ac=0.1, DS P=2.1 and a ball drop viscosity measured according to ASTM D-1343=0.2 seconds.

In one embodiment or in combination with any other embodiment, the biodegradable composition of the present application includes a biodegradable polymer selected from the group consisting of poly(butylene adipate terephthalate) and poly(butylene succinate terephthalate) copolymers blends or combinations thereof and up to 20% by weight or up to 10% by weight based on the total weight of the composition of cellulose acetate that has a ball drop viscosity as measured according to ASTM D-1343 of from 0.1 to 30 or 0.5 to 30 or 2 to 30; a DS Ac of from 1.8 to 2.6 or from 2.1 to 2.6; and a DS OH of from 1.2 to 0.4 or from 0.9 to 0.4.

In one embodiment or in combination with any other embodiment, the biodegradable composition of the present application is a homogeneous composition. As used herein, the term "homogeneous" is intended to describe a composition in which the biodegradable polymer and the cellulose ester are generally combinable to form a miscible blend with a generally single, continuous phase. A single, continuous polymer phase may be indicated in a sample for example by an absence of discrete polymer domains when visually inspected, such as for example viewed with atomic force microscopy at magnifications up to and including for example 10,000×. Homogeneity may alternatively be indicated by a change, upon blending, of the glass transition temperature (Tg) of any component in the blend. Other indications of homogeneity may be known to one of ordinary skill in the art. Homogeneous compositions of the present application are indicated as homogeneous by at least one indicator of homogeneity.

Depending in part on the end-use application for the composition of the present application, it may further include one or more additional ingredients generally referred to herein as additives. Non-limiting examples of additives include roll release agents, anti-block agents, nucleating agents, processing aids, lubricants, waxes, impact modifiers, antioxidants, acid scavengers, flame retardants, lubricants, light stabilizers, ultraviolet stabilizers or absorbers, dispersing aids, biocides, antistatic agents, water repelling additives, rodenticides, fillers such as calcium carbonate, glass beads and glass fibers; pigments, dyes, colorants and the like. In one embodiment or in combination with any other embodiment, the composition of the present application may include additional components useful in forming coatings or coating layers. Non-limiting examples include solvents, plasticizers, impact modifiers, waxes, mold releases, chain extenders and the like.

In one embodiment or in combination with any other embodiment, the biodegradable compositions of the present application is a bio-based composition. As defined herein, the term "bio-based" is intended to include materials intentionally made from substances derived from renewable biological resources, living (or once-living) organisms or materials or the like. Non-limiting examples of such biological resources include plants such as trees sugarcane, starch and the like. Biobased Content of Solid, Liquid, and Gaseous Samples can be determined for example under ASTM D6866-21.

In one embodiment or in combination with any other embodiment, the biodegradable composition includes a polyester having a melting temperature of 113° C. as measured according to differential scanning calorimetry (DSC) and the biodegradable composition has a melting temperature of between 90° C. and 113° C. as measured according to DSC.

In one embodiment or in combination with any other embodiment, the biodegradable composition includes a polyester with a crystallization temperature of about 84° C. as measured at a cooling rate of 20° C./min according to DSC and the biodegradable composition has crystallization temperature of about 40° C. as measured at a cooling rate of 20° C./min according to DSC.

In one embodiment or in combination with any other embodiment, the composition further comprises a blowing agent. In one embodiment or in combination with any other embodiment, the blowing agent comprises isohexane, isopentane, n-hexane, n-pentane, acetone, ethanol, isopropanol, methyl acetate, methyl formate, ethyl formate, or combinations thereof. In one embodiment or in combination with any other embodiment, the blowing agent is present at from 0.5 wt % to 5 wt %, or 0.1 wt % to 5 wt %, or from 1 wt % to 5 wt %, or 2 wt % to 5 wt %, based on the total weight of the composition.

In one embodiment or in combination with any other embodiment, the composition further comprises a nucleating agent. In one embodiment or in combination with any other embodiment, the nucleating agent is present at from 0.3 wt % to 1.5 wt %, or 0.5 wt % to 1.5 wt %, or 1.0 to 1.5 wt %, or 0.3 wt % to 1 wt %, or 0.3 to 5 wt %, or 0.3 to 4 wt %, or 0.3 to 3 wt %, or 0.3 to 2 wt %, based on the total weight of the composition. In one embodiment or in combination with any other embodiment, the nucleating agent is a particulate composition with a median particle size of less than 2 microns, or less than 1.5 microns, or less than 1 microns. In one embodiment or in combination with any other embodiment, the nucleating agent comprises a magnesium silicate, a silicone dioxide, a magnesium oxide, graphite, or combinations thereof.

The present application is directed to an object. The object includes or is formed from the biodegradable composition of the present application. Examples of objects may include without limitation films including oriented films and extruded films, extruded objects, sheets, boards, fibers, molded, cast or extruded objects, profile extruded articles such as drinking straws, multilayer laminates, expanded or extruded foams and related foam objects, thermoformed articles, and the like. In one embodiment or in combination with any other embodiment, the object may be a sheet or a board. In one embodiment or in combination with any other embodiment, the object may be a sheet. The sheet of the present application includes or is formed from the composition of the present application. Stated another way, the sheet of the present application comprises or is formed from a biodegradable composition that comprises (i) a biodegradable polymer and (ii) a cellulose ester. In one embodiment or in combination with any other embodiment s, the sheet of the present application has an average thickness of from 1.5 millimeters to 6.0 millimeters. In one or embodiments, the object of the present application is a film. The film of the present application includes or is formed from the compositions of the present applications. Stated another way, the film of the present application comprises or is formed from a biodegradable composition that comprises (i) a biodegradable polymer and (ii) a cellulose ester. In one embodiment or in combination with any other embodiment, the film of the present application has an average thickness of from 0.075-1.5 millimeters or 12 microns to 1524 microns. The films of the present application may be manufactured using conventional methods, devices and systems known in the art, such as for example solvent casting, melt extruded cast film, melt extruded blown film, melt extrusion coating/ lamination, melt extruded sheet, and oriented films via tentering or biax. The film may be used as a stand-alone structure or may be laminated or attached to other structures to form laminated articles, multilayer articles and the like.

In one embodiment or in combination with any other embodiment, the present application discloses a foam prepared from the composition disclosed herein. In one embodiment or in combination with any other embodiment, the foam has a density of from 0.05 g/cm$^3$ to 0.7 g/cm$^3$ and an average foam cell size of 0.05 mm to 0.8 mm.

In one embodiment or in combination with any other embodiment, the foam is in the form of a sheet. In one embodiment or in combination with any other embodiment, the foam is in the form of a bead.

In one embodiment or in combination with any other embodiment, the foam is biodegradable.

The present application is also directed to a coated article. In this aspect, the composition of the present application may be described as a coating composition. The article of the present application includes a substrate having a surface and a layer comprising the compositions of the present application on the surface. Stated another way, the article of the present application may include a substrate having a surface and a layer on the surface, wherein the layer includes a biodegradable composition that comprises (i) a biodegradable polymer and (ii) a cellulose ester. In one embodiment or in combination with any other embodiment, the layer may be formed by applying a coating onto the substrate using known and commercially available coating devices and systems such as those offered for sale by Davis Standard.

In one embodiment or in combination with any other embodiment, the layer of the coated article has an average thickness of 10 micrometers to 75 micrometers or 10 micrometers to 30 micrometers.

A suitable method and system for forming the coating of the article of the present application is exemplified in U.S. Pat. No. 3,340,123, the contents and disclosure of which are incorporated herein by reference. Accordingly, in one or more embodiments, the article of the present application may be a coated article and may include a substrate having a surface and a coating layer on that surface. The coated article may be in one example a drinking straw. In one or more embodiments, the layer may be formed by attaching or applying a pre-formed film onto the substrate using conventional laminating methods known in the art. Suitable laminating methods and systems for forming the article of the present application are exemplified in U.S. Pat. Nos. 9,150, 006 and 10,0654,404, assigned to the assignee of the present application, the contents and disclosure of which are incorporated herein by reference. Accordingly, in one or more embodiments, the article of the present application may be a laminated article and may include a substrate having a surface and a film layer on that surface.

In one embodiment or in combination with any other embodiment, the substrate of the article of the present application is a cellulosic material. Examples of such cellulosic materials include without limitation paper, cardboard, cotton, hemp, pulp, linters, wood, starch and the like. Other suitable substrates include fabrics, glass, and polymers. The coated article of the present application may be useful as a component in forming laminated products such as cupstock, paper food containers and the like.

The present application also discloses a hot melt adhesive. The ability to tune melt temperature, crystallization behavior and elasticity through blend ratio offer tunable hot melt adhesive compositions that are biodegradable. Applications that could benefit from this type of hot melt adhesive include but are not limited to: closing the flaps of corrugated boxes and paperboard cartons in the packaging industry; spine gluing in the bookbinding industry; profile-wrapping, product assembly and laminating applications in the woodworking industry; disposable diapers are constructed through the use of hot melt adhesives by bonding the non-woven material to both the backsheet and the elastics; and many electronic device manufacturers may also use an such an adhesive to affix parts and wires or to secure, insulate, and protect the device's components. The ability to tune crystallization and elasticity allows for a tunable hot melt adhesive that is biodegradable.

Specific Embodiments

Embodiment 1. A biodegradable composition, wherein the composition comprises: (a) a cellulose ester which is a cellulose acetate propionate ("CAP"); and (b) a biodegradable polymer which is a polyester, wherein the polyester is chosen from poly(butylene succinate) ("PBS"), poly(butylene succinate adipate) ("PBSA"), polycaprolactone ("PCL"), poly(butylene adipate terephthalate) ("PBAT"), polylactic acid ("PLA") or combinations thereof, wherein the CAP has an average degree of substitution for hydroxyl substituents that is from 0.3 to 1.2, an average degree of substitution for the acetyl substituents ("DS$_{Ac}$") that is from 0 to 0.5, an average degree of substitution for the propionyl substituents ("DS$_{Pr}$") that is from 1.3 to 2.5, and a ball drop viscosity of from 0.1 to 30 seconds as measured according to ASTM D-1343, wherein the CAP is present at from 1 wt % to 34 wt % based on the total weight of the cellulose ester and the biodegradable polymer, wherein the composition has a glass transition temperature ("T$_g$") of from –60 to –10° C., a melting temperature ("T$_m$") of from 60 to 130° C., a crystallization temperature ("T$_c$") of from 20 to 85° C., and a viscosity reduction of at least 20° C. measured at 180 to 230° C. as compared to the biodegradable polymer.

Embodiment 2. The biodegradable composition of Embodiment 1, wherein the CAP has a ball drop viscosity of from 0.1 to 0.4 seconds as measured according to ASTM D-1343.

Embodiment 3. The biodegradable composition of any one of Embodiments 1 or 2, wherein the biodegradable composition is homogeneous.

Embodiment 4. The biodegradable composition of any one of Embodiments 1-3, wherein the CAP is present at from 1 wt % to 18 wt %, based on the total weight of the cellulose ester and biodegradable polymer.

Embodiment 5. The biodegradable composition of any one of Embodiments 1-3, wherein the CAP is present at from 18 wt % to 34 wt %, based on the total weight of the cellulose ester and biodegradable polymer.

Embodiment 6. The biodegradable composition of any one of Embodiments 1-5, wherein the polyester is PBS.

Embodiment 7. The biodegradable composition of any one of Embodiments 1-5, wherein the polyester is PBSA.

Embodiment 8. The biodegradable composition of any one of Embodiments 1-5, wherein the polyester is PCL.

Embodiment 9. The biodegradable composition of any one of Embodiments 1-5, wherein the polyester is PBAT.

Embodiment 10. The biodegradable composition of any one of Embodiments 1-5, wherein the polyester is PLA.

Embodiment 11. A film comprising the composition of any one of Embodiments 1-10.

Embodiment 12. The film comprising the composition of Embodiment 11, wherein the film is from 12 to 1524 micrometers in thickness.

Embodiment 13. A drinking straw comprising the composition of any one of Embodiments 1-10.

Embodiment 14. A fiber comprising the composition of any one of Embodiments 1-10.

Embodiment 15. A molded object comprising the composition of any one of Embodiments 1-10.

Embodiment 16. A paper or paperboard, comprising a coating comprising any one of the compositions of Embodiments 1-10.

Embodiment 17. The paper or paperboard of Embodiment 16, wherein the coating is from 10 to 75 micrometers in thickness.

Embodiment 18. A paper cup, comprising the paper or paperboard of any one of Embodiments 16-17.

Embodiment 19. A coated article comprising a substrate comprising a surface and a layer comprising the composition of any one of Embodiments 4 or 5 on said surface.

Examples

The following examples, while provided to illustrate with specificity and detail the many aspects and advantages of the present application, are not to be interpreted as in any way limiting its scope. Variations, modifications and adaptations which do depart from the spirit of the present application will be readily appreciated by one of ordinary skill in the art.

Abbreviations

AFM is atomic force microscopy; BA is blowing agent; DSC is differential scanning calorimetry; EF is ethyl formate; EV is elongation viscosity; Ex is example(s); PBAT is poly(butylene adipate terephthalate); CA-398-30 is Cellulose Acetate CA-398-30; Cellulose Acetate CA-398-3; CAP-504-0.2 is Cellulose Acetate Propionate CAP-504-0.2; CAP-482-20 is Cellulose Acetate Propionate CAP-482-20; CAP-482-0.5 is Cellulose Acetate Propionate CAP-482-0.5; IH is isohexane; PBS is poly(butylene succinate); PBST is poly(butylene succinate terephthalate); RH is relative humidity; rpm is revolutions per minute; SEM is scanning electron microscopy; min is minute(s); ° C. is degree(s) Celsius; Tg is glass transition temperature; Tm is melting temperature or point; Tc is crystallization temperature; sec is second(s); h is hour(s);

Ex 1-27

In this set of Examples, compositions of the present invention were evaluated for homogeneity (as determined by visual inspection using atomic force microscopy) and related utility as film or coating. Control samples (Ex 1-3) and samples of the biodegradable compositions of the present invention (Ex 4-27) were prepared. PBS homopolymers were procured from PTT MCC Biochem with the grade designation FZ91PM. A poly(butylene succinate) copolymer, poly(butylene succinate adipate), was procured from PTT MCC Biochem with a grade designation FD92PM. Cellulose acetate propionate and Cellulose acetate were procured from Eastman Chemical Company. Compositions for Ex 1-27 as listed in Table 1 below were prepared. Ex 1 was a control sample of 100% CAP-504-0.2 while Ex 2-3 were control samples of 100% biodegradable polymer and the remaining examples were compositions of the present invention as listed. The biodegradable polymer was an aliphatic polyester selected from either homopolymer PBS (PBS FZ91) or copolymer PBS (PBS FD92) and the cellulose ester was CAP-504-0.2 for Ex 4-17 and CA-398-30 for Ex 24-27. A multifunctional epoxide stabilizer, Joncryl 4468 (BASF), was added to select examples as indicated. Formulation details are provided below, with percentages being weight percent based on the total weight of the composition.

All samples were compounded with a 26 mm twin screw extruder using the procedure generally described in Ex 1-27 below. Temperatures for extrusion compounding ranged from 180-220° C. A melt was formed into strands, cooled, and pelletized. All samples except for samples 2 and 3 were extruded into films for further evaluation using a single screw extruder with a film die.

TABLE 1

| | Cellulose Ester Degree of Substitution (Ds) | | | Biodegradable Polymer | | Stabilizer |
|---|---|---|---|---|---|---|
| Ex | Ds OH | Ds Ac | Ds Pr | Type | wt. % | wt % |
| 1 | 0.8 | 0.1 | 2.1 | None | None | none |
| 2 | Na | Na | Na | PBS FZ 91 | 100 | none |
| 3 | Na | Na | Na | PBS FD92 | 100 | none |
| 4 | 0.8 | 0.1 | 2.1 | PBS FZ91 | 95 | none |
| 5 | 0.8 | 0.1 | 2.1 | PBS FZ 91 | 90 | none |
| 6 | 0.8 | 0.1 | 2.1 | PBS FZ 91 | 85 | none |
| 7 | 0.8 | 0.1 | 2.1 | PBS FZ 91 | 80 | none |
| 8 | 0.8 | 0.1 | 2.1 | PBS FZ 91 | 70 | none |
| 9 | 0.8 | 0.1 | 2.1 | PBS FZ 91 | 50 | none |
| 10 | 0.8 | 0.1 | 2.1 | PBS FZ 91 | 30 | none |
| 11 | 0.8 | 0.1 | 2.1 | PBS FZ 91 | 79.8 | 0.2 |
| 12 | 0.8 | 0.1 | 2.1 | PBS FZ 91 | 79.6 | 0.4 |
| 13 | 0.8 | 0.1 | 2.1 | PBS FD 92 | 90 | None |
| 14 | 0.8 | 0.1 | 2.1 | PBS FD 92 | 80 | None |
| 15 | 0.8 | 0.1 | 2.1 | PBS FD 92 | 79.8 | 0.2 |
| 16 | 0.8 | 0.1 | 2.1 | PBS FD 92 | 79.6 | 0.4 |
| 17 | 0.8 | 0.1 | 2.1 | PBS FD 92 | 30 | none |
| 18 | 1.0 | 0.9 | 1.1 | PBS FD 92 | 90 | none |
| 19 | 1.0 | 0.9 | 1.1 | PBS FD 92 | 80 | none |
| 20 | 0.8 | 1.1 | 1.1 | PBS FD 92 | 90 | none |
| 21 | 0.8 | 1.1 | 1.1 | PBS FD 92 | 80 | none |
| 22 | 0.9 | 0.5 | 1.6 | PBS FD 92 | 90 | none |
| 23 | 0.9 | 0.5 | 1.6 | PBS FD 92 | 80 | none |
| 24 | 0.55 | 2.45 | 0 | PBS FZ 91 | 90 | none |
| 25 | 0.55 | 2.45 | 0 | PBS FZ 91 | 80 | none |
| 26 | 0.55 | 2.45 | 0 | PBS FD 92 | 90 | none |
| 27 | 0.55 | 2.45 | 0 | PBS FD 92 | 80 | none |

Select examples were analyzed and compared to control Ex 2 and 3 via differential scanning calorimetry (DSC) using the device and technique described below. DSC (DSC, Q 2000, TA Instruments, New Castle, DE, USA) was then used to determine the thermal transitions of the compositions. The Tg, Tm values and heat of melting (Hm1) of the compositions were determined. To analyze, 4 to 8 mg of each sample was sealed in an aluminum DSC pan and evaluated using a "heat-cool-heat" method. For the $1^{st}$ heat, the samples were evaluated from −80° C. to 250° C. at a scan rate of 20° C. per min and transition values were marked as Tg1, Tm1 and Hm1. Next the sample was cooled from 250° C. to −80° C. at a scan rate of 20° C. per min and transitions were marked as "cooled". Finally, the samples were reheated a second time from −80° C. to 250° C. at a scan rate of 20° C. per min and transitions were marked. The results are set forth in Table 2 and Table 3 below.

TABLE 2

| | DSC values | | | | | |
|---|---|---|---|---|---|---|
| | Tg, $1^{st}$ heat | Tm, $1^{st}$ heat | Hm, $1^{st}$ heat | Tg, $2^{nd}$ heat | Tm, $2^{nd}$ heat | Hm, $2^{nd}$ heat |
| Ex | ° C. | ° C. | cal/g | ° C. | ° C. | cal/g |
| 2 | −36.4 | 113.3 | 16.1 | −34.1 | 113.2 | 21.2 |
| 4 | −29 | 105.4 | 17 | −30.2 | 103.6 | 16.4 |
| 5 | −25.5 | 102.9 | 15.7 | −27.8 | 100.8 | 14.5 |
| 6 | −20.6 | 102.6 | 15.5 | −26.1 | 99.2 | 12.3 |
| 7 | −19.6 | 101.7 | 13.4 | −23 | 97 | 10.8 |
| 1 | 161.43 | | | 154.6 | | |
| 3 | −46.4 | 83.9 | 13.3 | −45.2 | 84 | 9.8 |
| 8 | −18/46.8 | 98.8 | 9.1 | −29.5 | 99.3 | 0.6 |
| 9 | −11.6/52 | 96.3 | 4.0 | −17.1 | n/a | n/a |
| 10 | −11.2/47.3 | n/a | n/a | −6.9 | n/a | n/a |
| 11 | −19.75/55.7 | 101.4 | 13.4 | −22.8 | 98.2 | 9.4 |
| 12 | −22.6/56 | 99.8 | 15.3 | −24.1 | 97.2 | 10.3 |
| 13 | −39.7 | 71.9 | 10.96 | −39.7 | 70.1 | 8.9 |
| 14 | −36.2 | 72.4 | 9.28 | −39.9 | 75.3 | 0.43 |
| 15 | −35.2 | 72.9 | 8.82 | −39.4 | 74.8 | 0.55 |
| 16 | −35.9 | 72.8 | 9.45 | −39.3 | 74.8 | 0.86 |
| 17 | −11.3 | n/a | n/a | −7.4 | n/a | n/a |
| 24 | −29.0 | 112.3 | 16.8 | −30 | 107.9 | 15.1 |
| 25 | −32.4 | 106 | 18.2 | −32 | 105 | 14.4 |
| 26 | −42.9 | 83.5 | 11.5 | −43.9 | 84.0 | 10.7 |
| 27 | −43.5 | 81.8 | 10.9 | −44.3 | 83.3 | 9.6 |

TABLE 3

| | Cellulose Ester Degree of Substitution (Ds) | | | Biodegradable Polymer | | DSC values | | |
|---|---|---|---|---|---|---|---|---|
| Ex | Ds OH | Ds Ac | Ds Pr | Type | wt. % | Tg, $2^{nd}$ heat, ° C. | Tm, $2^{nd}$ heat, ° C. | Tc, cool, ° C. |
| 18 | 1.0 | 0.9 | 1.1 | PBS FD92 | 90 | −42.7 | 79.2 | 35.7 |
| 19 | 1.0 | 0.9 | 1.1 | PBS FD92 | 80 | −42.2 | 77.1 | 34.6 |
| 20 | 0.8 | 1.1 | 1.1 | PBS FD92 | 90 | −44.5 | 81.7 | 38.0 |
| 21 | 0.8 | 1.1 | 1.1 | PBS FD92 | 80 | −44.2 | 81.1 | 37.4 |
| 22 | 0.9 | 0.5 | 1.6 | PBS FD92 | 90 | −43.6 | 78.2 | 34.6 |
| 23 | 0.9 | 0.5 | 1.6 | PBS FD92 | 80 | −42.2 | 77.2 | 31.5 |

Ex 4-12 exhibits lower melting temperature and higher glass transition temperature compared to control 2. Ex 13-23 exhibits lower melting temperature and higher glass transition temperature compared to control 3

Polymer miscibility (and therefore homogeneity) may be evaluated from this above thermal data. For example, one method to evaluate miscibility is to monitor change in Tg as a function of component ratios and heat of melting. For miscible and compatible blends, the Tg may shift between the two polymers with miscibility and partial miscibility. Similarly, changes to the heat of melting (Hm) as a function of component ratios may illustrate the impact of each component's relative amount on a composition's rate of crystallization. As suggested in the above Table 3 and 4, CAP 504-0.2 has a much larger impact on Tg depression than CA 398-3. In addition, CAP 504-0.2 has a much larger impact on Hm changes than CA 398-3.

Observations were made of extrudate clarity upon exiting the die to serve as a good initial qualitative indication of polymer miscibility as, upon cooling, strands can turn opaque due to either refractive index mismatch or crystallization. As the polymer exits the die, one can judge the clarity and opacity as a means of evaluating miscibility or refractive index matching of a blend. Transparency of the melt can qualitatively indicate miscibility and homogeneity. Materials can shift clarity as a function of temperature due to a shift in refractive index of the two materials or due to crystallization of the blend. Materials that are hazy exiting the die are typically comprised of components that are not miscible. These observations are detailed in Table 4 below, with observations for Ex 24-27 indicating immiscible blends.

TABLE 4

| Ex | Appearance | |
| | At Die Exit | After Cooling in Bath |
| --- | --- | --- |
| 1 | Clear | Clear |
| 2 | n/a | n/a |
| 3 | n/a | n/a |
| 5 | Clear | Hazy |
| 7 | Clear | Hazy |
| 8 | Clear | Hazy |
| 9 | Clear | Hazy |
| 10 | Clear | Clear |
| 11 | Clear | Hazy |
| 12 | Clear | Hazy |
| 13 | Clear | Hazy |
| 14 | Clear | Hazy |
| 15 | Clear | Hazy |
| 16 | Clear | Hazy |
| 17 | Clear | hazy |
| 24 | hazy | hazy |
| 25 | hazy | hazy |
| 26 | hazy | hazy |
| 27 | hazy | hazy |

Samples were then evaluated for homogeneity by visual inspection using atomic force microscopy with magnification of up to 10,000×. Of the non-control examples listed, samples containing CAP-504-0.2 in either PBS homopolymer or copolymer resulted in a homogenous material when extruded. Use of other cellulose esters such as cellulose acetate (CA-398-30) has been observed to result in a two-phase system.

The impact of the cellulose ester on crystallinity of the examples was also evaluated based on the data in Table 5. For this evaluation, crystallinity was calculated by taking the Heat of melting (HM1 or HM2) and dividing by a published heat of melting constant value for the biodegradable polymer, here 26.4 cal/g (110.3 J/g) as reported in published literature (e.g., Van Krevelen, D. W. Properties of Polymers, 3rd ed.; Elesvier: 1990; pp 109-127) for crystalline PBS (1-3). Data for crystallinity calculation is set forth in Table 5 below.

TABLE 5

| Ex | $1^{st}$ heat % crystallinity | $2^{nd}$ heat % crystallinity | Control Reference | Delta $1^{st}$ heat crystallinity from control | Delta $2^{nd}$ heat crystallinity versus control |
| --- | --- | --- | --- | --- | --- |
| 1 | 0 | 0 | n/a | n/a | n/a |
| 2 | 75 | 56 | n/a | n/a | n/a |
| 3 | 51 | 37 | n/a | n/a | n/a |
| 5 | 59 | 55 | 2 | −16 | −1 |
| 7 | 49 | 45 | 2 | −26 | −11 |
| 8 | 35 | 2 | 2 | −40 | −53 |
| 9 | 15 | 0 | 2 | −60 | −56 |
| 10 | 0 | 0 | 2 | −75 | −56 |
| 11 | 51 | 36 | 2 | −24 | −20 |
| 12 | 58 | 39 | 2 | −17 | −17 |
| 13 | 42 | 34 | 3 | −9 | −3 |
| 14 | 35 | 2 | 3 | −16 | −35 |
| 15 | 34 | 2 | 3 | −17 | −35 |
| 16 | 36 | 3 | 3 | −15 | −34 |
| 17 | 0 | 0 | 3 | −51 | −37 |
| 24 | 64 | 58 | 2 | −11 | 2 |
| 25 | 69 | 55 | 2 | −6 | −1 |
| 26 | 44 | 41 | 3 | −7 | 4 |
| 27 | 42 | 36 | 3 | −9 | −1 |

For Ex 5-17, a significant reduction in crystallinity in both the $1^{st}$ and $2^{nd}$ heating was observed, indicating that the cellulose ester functioned well as a crystallization modifier of the biodegradable polymer. In Ex 24-27 (using cellulose acetate), the impact of the cellulose ester on polymer crystallinity is lower than the impact from cellulose acetate propionate.

Finally, the impact of the cellulose ester on viscosity of the examples was evaluated by comparing the measured viscosity of a composition to the measured viscosity of the biodegradable polymer for that composition as a control, with the comparison was made by calculating the change in viscosity versus the control according to the following equation:

$$\% \text{ change in viscosity} =$$

$$(\text{viscosity}_{sample} - \text{viscosity}_{control})/\text{viscosity}_{control} \times 100$$

Wherein $\text{viscosity}_{control}$ is the measured viscosity of the biodegradable polymer of the composition and $\text{viscosity}_{sample}$ is the measured viscosity of the sample composition. Viscosity was measured using a TA Instruments ARES-G2. Prior to measuring viscosity, the samples were dried in a vacuum oven for two days at 60° C. The temperature sweeps were determined by measuring the viscosity from 180° C. to 220° C. at 10 rad/sec. The ramp rate was 5° C./min and sampling interval was 10 seconds using a strain rate of 10%. Data for the viscosity evaluation is set forth in Table 6 below. Example numbers in Table 6 remain the same but are arranged based on biodegradable polymer choice.

17

TABLE 6

| | Measured Complex Viscosity, Eta* | | | % viscosity change vs control | | | |
|---|---|---|---|---|---|---|---|
| Ex | 180° C. (poise) | 200° C. (poise) | 200° C. (poise) | Control Sample | 180° C. (%) | 200° C. (%) | 220° C. (%) |
| 2 | 18593 | 15734 | 13339 | n/a | n/a | n/a | n/a |
| 5 | 13003 | 10392 | 8203 | 2 | −30.1% | −34.0% | −38.8% |
| 7 | 10262.6 | 7857.1 | 5936.4 | 2 | −44.8% | −50.1% | −55.7% |
| 8 | 8050.9 | 5800.6 | 4166.4 | 2 | −56.7% | −63.1% | −68.9% |
| 9 | 6125.8 | 3588.9 | 2176.4 | 2 | −67.1% | −77.2% | −83.8% |
| 10 | 11913.3 | 4122.7 | 1686.1 | 2 | −35.9% | −73.8% | −87.4% |
| 11 | 10879 | 9211.2 | 8770.1 | 2 | −41.5% | −41.5% | −34.5% |
| 12 | 11196.8 | 10040.7 | 10931.2 | 2 | −39.8% | −36.2% | −18.4% |
| 24 | 25198.4 | 20363.5 | 16258 | 2 | 35.5 | 29.4 | 21.3 |
| 25 | 44880.4 | 30607.5 | 21659.7 | 2 | 141.4 | 94.5 | 61.6 |
| 3 | 18030.6 | 15193.6 | 12742.4 | n/a | n/a | n/a | n/a |
| 13 | 13278.1 | 10579.5 | 8423.2 | 3 | −26.4 | −30.4 | −33.9 |
| 14 | 10290.8 | 7979.1 | 6058.2 | 3 | −42.9 | −47.5 | −52.5 |
| 15 | 10536.5 | 8883.4 | 8178.4 | 3 | −41.6 | −41.5 | −35.8 |
| 16 | 10908.2 | 9996.5 | 11081.5 | 3 | −39.5 | −34.2 | −13.0 |
| 27 | 11384.4 | 4042.4 | 1707.2 | 3 | −36.9 | −73.4 | −86.6 |
| 26 | 26308.5 | 21373.6 | 17166.2 | 3 | 45.9 | 40.7 | 34.7 |
| 27 | 51646.6 | 32149 | 21789 | 3 | 186.4 | 111.6 | 71.0 |

In the grouping with the biodegradable homopolymer (Ex 2) as the control, Ex 11 and 12 showed less of a reduction in viscosity as a function of temperature than Ex 7, indicating that the stabilizer has a positive impact on viscosity retention. The cellulose ester present in Ex 24 and 25 achieved a viscosity increase for the blend, the level of which was not achieved in the other examples. Part of this may be due to the molecular weight of the cellulose ester and part may be due to blend immiscibility. For miscible and partially miscible blends, the ability to tune the viscosity by altering blend ratio, molecular weight, and additive use is a desired attribute.

In the grouping with the biodegradable copolymer (Ex 3) as the control, Ex 15 and 16 show less of a reduction in viscosity as a function of temperature than Ex 14 indicating the stabilizer used has a positive impact on viscosity retention. Likewise, the cellulose ester additive used in Ex 26 and 27 shows an increase in viscosity for the blend not illustrated in the other examples. Part of this is due to the molecular weight of the additive and part is due to the immiscible blend that has formed. For miscible and partially miscible blends, the ability to tune the viscosity by altering blend ratio, molecular weight, and additive use is a desired attribute.

18

Ex 28-38

In this set of Examples, Control samples (Ex 28-29) and samples of the biodegradable compositions of the present invention (Examples 31-38) were prepared. Poly(butylene succinate) (PBS) were procured from PTTMCC with the grade designation FZ91PM, FZ71PM, and FZ79AC. Cellulose acetate propionates and cellulose acetate were procured from Eastman Chemical Company. Formulation details are provided in Table 7, with percentages being weight percent based on the total weight of the composition.

All samples were compounded with a 26 mm twin screw extruder using the procedure generally described here. Temperatures for extrusion compounding ranged from 180-220° C. A melt was formed into strands, cooled, and pelletized.

Selected compositions of the present invention were analyzed and compared to control Examples (28-29) via DSC. DSC (DSC, Q2000, TA Instruments, New Castle, DE, USA) was used to determine the thermal transitions of the compositions. The Tg, Tm, and Tc of the compositions were determined. To analyze, 4 to 8 mg of each sample was sealed in an aluminum DSC pan and evaluated using a "heat-cool-heat" method. The sample was first heated from −80° C. to 220° C. at a scan rate of 20° C. per min. Then the sample was cooled from 220° C. to −80° C. at a scan rate of 20° C. per min and transitions were marked as "cool". Finally, the samples were reheated a second time from −80° C. to 220° C. at a scan rate of 20° C. per min and transitions were marked (2nd heat). The results of this thermal evaluation have been in Table 7.

TABLE 7

| | Cellulose Ester Degree of Substitution (Ds) | | | Biodegradable Polymer | | DSC values | | |
|---|---|---|---|---|---|---|---|---|
| Ex | Ds OH | Ds Ac | Ds Pr | Type | wt. % | Tg, 2nd heat, ° C. | Tm, 2nd heat, ° C. | Tc, cool, ° C. |
| 28 | | | | FZ 71 | 100 | −33.6 | 114 | 83.8 |
| 29 | | | | FZ 79 | 100 | −32.0 | 115.6 | 77 |
| 30 | 0.8 | 0.1 | 2.1 | FZ 71 | 95 | −30.0 | 104.9 | 64.8 |
| 31 | 0.8 | 0.1 | 2.1 | FZ 71 | 90 | −29.5 | 95.2 | 51.6 |
| 32 | 0.8 | 0.1 | 2.1 | FZ 79 | 95 | −29.0 | 101 | 65.2 |
| 33 | 0.8 | 0.1 | 2.1 | FZ 79 | 90 | −27.5 | 98.5 | 57 |
| 34 | 1.0 | 0.05 | 1.95 | FZ 79 | 95 | −29.2 | 102.6 | 65 |
| 35 | 1.0 | 0.05 | 1.95 | FZ 79 | 90 | −27.7 | 101.3 | 59.4 |
| 36 | 1.0 | 0.05 | 1.95 | FZ 79 | 85 | −26.7 | 99 | 54.4 |
| 37 | 0.4 | 0.1 | 2.5 | FZ 91 | 80 | −27.3 | 95 | 50.2 |
| 38 | 0.3 | 0.1 | 2.6 | FZ 91 | 80 | −24.9 | 94 | 39.3 |

Ex 30-38 exhibit higher glass transition temperature compared to control Ex 28-29. Ex 30-38 exhibit lower melting temperature and significantly lower crystallization temperature compared to control Ex 28-29.

Selected samples were then evaluated for homogeneity by AFM or SEM, as shown in Table 8.

TABLE 8

| Ex | Miscibility (Yes/No) | Domain size (μm) |
|---|---|---|
| 2 | — | — |
| 5 | Yes | — |
| 7 | Yes | — |
| 8 | Yes | — |
| 25 | No | 1-10 |
| 28 | — | — |
| 29 | — | — |
| 30 | Yes | — |

TABLE 8-continued

| Ex | Miscibility (Yes/No) | Domain size (μm) |
|---|---|---|
| 31 | Yes | — |
| 32 | Yes | — |
| 33 | Yes | — |
| 34 | Yes | — |
| 35 | Yes | — |
| 36 | Yes | — |
| 37 | Yes | — |
| 38 | Yes | — |

Ex 2, 28 and 29 are the control, homogeneous. Ex 25 have two phases. Ex 30-38 are homogeneous. Homogeneous morphology means polymers are miscible in blends. Two phase structure means polymers are non-miscible in blends.

The impact of the cellulose ester on viscosity of the examples was evaluated by comparing the measured viscosity of a composition to the measured viscosity of the biodegradable polymer for that composition as a control, with the comparison was made by calculating the change in viscosity versus the control according to the following equation:

$$\% \text{ change in viscosity} =$$

$$(\text{viscosity}_{sample} - \text{viscosity}_{control})/\text{viscosity}_{control} \times 100$$

Wherein $\text{viscosity}_{control}$ is the measured viscosity of the biodegradable polymer of the composition and $\text{viscosity}_{sample}$ is the measured viscosity of the sample composition. Viscosity was measured using a TA Instruments ARES-G2. Prior to measuring viscosity, the samples were dried in a vacuum oven for two days at 60° C. The temperature sweeps were determined by measuring the viscosity from 190° C. to 230° C. at 10 rad/sec. The ramp rate was 5° C./min and sampling interval was 10 seconds using a strain rate of 0.1%. Data for the viscosity evaluation is described in Table 9 below.

TABLE 9

| Ex | Measured Complex Viscosity, Eta* | | | % viscosity change vs control | | | |
|---|---|---|---|---|---|---|---|
| | 190° C. (Pa S) | 210° C. (Pa S) | 230° C. (Pa S) | Control Sample | 190° C. (%) | 210° C. (%) | 230° C. (%) |
| 29 | 749.4 | 580.6 | 467.5 | n/a | n/a | n/a | n/a |
| 32 | 457.7 | 332.5 | 247.0 | 29 | −38.9% | −42.7% | −47.2% |
| 33 | 411.3 | 296.5 | 210.3 | 29 | −45.1% | −48.9% | 55.0% |
| 34 | 569.0 | 421.8 | 320.9 | 29 | −24.1% | −27.3% | −31.4% |
| 35 | 500.1 | 361.7 | 257.1 | 29 | −33.3% | −37.7% | −45% |
| 36 | 448.6 | 314.5 | 226.1 | 29 | −40.1% | −45.8% | −51.6% |

The cellulose ester presents in examples 32-36 decreases the viscosity, compared to Ex 29.

The EV of the examples was evaluated by comparing the measured EV at a Hencky strain of 3 to the measured EV at a Hencky strain of 0.1, with the comparison was made by calculating the change in EV at high Hencky strain versus the EV at low Hencky strain as following equation:

$$EV \text{ Change} = (EV_3 - EV_{0.1})/EV_{0.1}$$

Wherein $EV_3$ is the measured EV of the sample at a Hencky strain of 3 and $EV_{0.1}$ is the measured EV of the sample at a Hencky strain of 0.1. EV was measured using a TA Instruments ARES-G2 equipped with an Extensional Viscosity Fixture. The films were prepared by compression molding at 200° C. with a thickness of 20 mils. Prior to measuring viscosity, the samples were dried in a vacuum oven for two days at 60° C. The EVs were determined by measuring the viscosity at a strain rate of 10 s⁻¹ at 150° C. Data for the EV evaluation is described in Table 10 below.

TABLE 10

| Ex | Measured Elongation Viscosity | | EV change |
|---|---|---|---|
| | $EV_{0.1}$ (Pa S) | $EV_3$ (Pa S) | $EV_3 - EV_{0.1})/EV_{0.1}$ |
| 2 | 4243 | 151735 | 34.8 |
| 29 | 2504 | 24616 | 8.8 |
| 4 | 2846 | 47153 | 15.6 |
| 5 | 2800 | 35465 | 11.7 |
| 6 | 2504 | 25839 | 9.3 |
| 7 | 2344 | 21293 | 8.1 |
| 32 | 1981 | 10432 | 4.3 |
| 33 | 1981 | 8142 | 3.1 |
| 36 | 2049 | 15342 | 6.5 |
| 25 | 19623 | 5664 | −0.7 |

Strain hardening exists in Examples 2, 29, 4-7, and 32-36, while strain softening happens in Example 25.

Selected samples were then used for Extrusion Paper Coating. Extruder screw used had a 2.5" screw with L/D of 34:1. The extruder screw used had feed depth (hf) of 12.7 mm and Metering depth of 3.6 with compression ratio (hf/hm) of 3.60. Chill roller used was Soft Matte 70-78 Ra. Extruder temperatures were set according to the Table 11.

TABLE 11

| Extruder | 29 Temp. (° C.) | 30 Temp. (° C.) | 31 Temp. (° C.) |
|---|---|---|---|
| Barrel 1 | 216 | 216 | 216 |
| Barrel 2 | 221 | 221 | 221 |
| Barrel 3 | 232 | 232 | 232 |
| Barrel 4 | 238 | 238 | 238 |
| Barrel 5 | 243 | 243 | 243 |
| Flange | 238 | 238 | 238 |
| Adapter | 232 | 232 | 232 |
| Feed Block | 232 | 232 | 232 |
| Die 1 | 229 | 229 | 229 |
| Die 2 | 229 | 229 | 229 |
| Die 3 | 229 | 229 | 229 |
| Die 4 | 229 | 229 | 229 |
| Die 5 | 229 | 229 | 229 |
| Melt | 2600 | 2500 | 2700 |
| Melt Temp | 237 | 236 | 233 |

The maximum coating speed when running control example 29 is 750 feet per minute, while the maximum line speed of Examples 30 and 31 can reach 1000 feet per minutes. Examples 30 and 31 have very good paper adhesion to paper while control example 29 don't have any paper adhesion at 21 um coating thickness.

Ex 39-44

In this set of Examples, Control samples (Ex 39-41) and samples of the biodegradable compositions of the present invention (Ex 42-44) were prepared. PBS KHB22 were procured from Yingkou Kanghui and TH803S305 and TH803S405 were procured from Xinjiang Blueridge Tunhe Chemical Industry. Formulation details are provided in Table 12, with percentages being weight percent based on the total weight of the composition.

TABLE 12

| | Cellulose Ester Degree of Substitution (Ds) | | | Biodegradable Polymer | | DSC values | | |
|---|---|---|---|---|---|---|---|---|
| Ex | Ds OH | Ds Ac | Ds Pr | Type | wt. % | Tg, $2^{nd}$ heat, ° C. | Tm, $2^{nd}$ heat, ° C. | Tc, cool, ° C. |
| 39 | | | | KHB22 | 100 | −33.6 | 112.2 | 71.6 |
| 40 | | | | TH803S305 | 100 | −31.1 | 114.9 | 64.5 |
| 41 | | | | TH803S405 | 100 | −32.4 | 116.8 | 59 |
| 42 | 0.8 | 0.1 | 2.1 | KHB22 | 80 | −24.7 | 100.8 | 48.4 |
| 43 | 0.8 | 0.1 | 2.1 | TH803S305 | 80 | −21.9 | 101.4 | 23.6 |
| 44 | 0.8 | 0.1 | 2.1 | TH803S405 | 80 | −19.2 | 100.7 | 23.3 |

Ex 42-44 exhibit lower melting temperature and significantly lower crystallization temperature compared to control Ex 39-41.

The samples were then evaluated for homogeneity by AFM, as summarized in Table 13.

TABLE 13

| Ex | Miscibility (Yes/No) | Domain size (μm) |
|---|---|---|
| 39 | — | — |
| 40 | — | — |
| 41 | — | — |
| 42 | Yes | — |
| 43 | Yes | — |
| 44 | Yes | — |

Ex 42-44 are homogeneous. Homogeneous morphology means polymers are miscible in blends.

The impact of the cellulose ester on viscosity of the examples was evaluated at the same way as described above. Data for the viscosity evaluation is included in Table 14 below:

TABLE 14

| Ex | Measured Complex Viscosity, Eta* | | | % viscosity change vs control | | | |
|---|---|---|---|---|---|---|---|
| | 190° C. (Pa S) | 210° C. (Pa S) | 230° C. (Pa S) | Control Sample | 190° C. (%) | 210° C. (%) | 230° C. (%) |
| 39 | 1945.7 | 1529.6 | 1029.4 | n/a | n/a | n/a | n/a |
| 40 | 1186.8 | 865.8 | 600.5 | n/a | n/a | n/a | n/a |
| 41 | 832.4 | 601.0 | 415.4 | n/a | n/a | n/a | n/a |
| 42 | 1268.5 | 944.5 | 647.4 | 39 | −34.8% | −38.2% | −37.1% |
| 43 | 704.1 | 474.3 | 317.2 | 40 | −40.6% | −45.2% | −47.2% |
| 44 | 547.3 | 374.7 | 247.0 | 41 | −34.2% | −37.6% | −40.5% |

The cellulose ester presents in Ex 42-44 decreases the viscosity, compared to Ex 39-41.

Ex 45-47

In this set of Examples, Control samples (Ex 45) and samples of the biodegradable compositions of the present invention (Ex 46-47) were prepared. Formulation details are provided in Table 15. The present invention were analyzed and compared to control Examples (45) via DSC using the device and technique described above.

TABLE 15

| | Cellulose Ester Degree of Substitution (Ds) | | | Biodegradable Polymer | | DSC values | | |
|---|---|---|---|---|---|---|---|---|
| Ex | Ds OH | Ds Ac | Ds Pr | FZ 91 wt. % | FZ71 wt. % | Tg, $2^{nd}$ heat, ° C. | Tm, $2^{nd}$ heat, ° C. | Tc, cool, ° C. |
| 45 | | | | 50 | 50 | −33.0 | 114 | 84.4 |
| 46 | 0.8 | 0.1 | 2.1 | 47.5 | 47.5 | −30.2 | 103.7 | 68.3 |
| 47 | 0.8 | 0.1 | 2.1 | 45 | 45 | −27.5 | 100.7 | 59.8 |

Ex 46-47 exhibit lower melting temperature and significantly lower crystallization temperature compared to control Ex 45.

The impact of the cellulose ester on viscosity of the examples was evaluated at the same way as described above. Data for the viscosity evaluation is included in Table 16 below:

TABLE 16

| | Measured Complex Viscosity, Eta* | | | % viscosity change vs control | | | |
|---|---|---|---|---|---|---|---|
| Ex | 190° C. (Pa S) | 210° C. (Pa S) | 230° C. (Pa S) | Control Sample | 190° C. (%) | 210° C. (%) | 230° C. (%) |
| 45 | 2319.9 | 1966.7 | 1678.0 | n/a | n/a | n/a | n/a |
| 46 | 926.4 | 709.1 | 538.4 | 45 | −60.1% | −63.9% | −67.9% |
| 47 | 554.5 | 407.2 | 299.1 | 45 | −76.1% | −79.3% | −82.2% |

The cellulose ester presents in Ex 46-47 decreases the viscosity, compared to Ex 45.

Ex 48-53

In this set of Examples, compositions of the present invention were evaluated for film-forming qualities such as visual quality, visible defects, and adhesion. Samples of the biodegradable compositions of the present invention (Ex 48-53) were prepared. PBAT was procured from Ecoworld. PBST was procured from Ecoworld. Cellulose acetate propionates were procured from Eastman Chemical Company under the grader designations CAP-504-0.2 Cellulose acetate was procured from Eastman Chemical under the grade designation CA-398-30. Formulation details are provided below, with percentages being weight percent based on the total weight of the composition.

Ex 48: PBAT with 5% CAP-504-0.2
Ex 49: PBAT with 20% CAP-504-0.2
Ex 50: PBST with 5% CAP-504-0.2
Ex 51: PBST with 20% CAP-504-0.2
Ex 52: PBAT with 15% CA-398-30
Ex 53: PBAT with 30% CA-398-30

Examples were produced using twin screw extrusion compounding. Temperatures for extrusion compounding ranged from 200-230° C. A melt was formed into strands, cooled, and pelletized. Films were prepared extruding each of the samples using a single screw extruder with a film die, with set temperature of around 230° C. and a target film thickness of 5 mils. After exiting the die, material was run into contact with a chill roll and pulled between two subsequent rolls before collection.

Films were qualitatively evaluated for adhesion, both self-adhesion and adhesion to the chill roll (adhesion to rolls is often generally referred to as "blocking"). Films were also visually inspected using optical light microscopy at a magnification of 10,000× and evaluated for smoothness as an indicator of general film quality.

Ex 48-49 and 50-51, which were observed to adhere to themselves and to the chill roll, had good visual quality and showed a smooth surface upon close inspection. Ex 50 had a low adhesion but lower visual quality with a non-uniform surface. Ex 52 and 53 were observed to have low adhesion and good visual quality and showed a very fine level of nonuniformity on the surface.

Ex 54-58

In this set of Examples, samples of the biodegradable compositions of the present invention (Ex 54-58) were prepared. PBAT TH801K is poly(butylene adipate terephthalate) and was procured from Xinjiang Blueridge Tunhe Chemical Industry. Formulation details are provided in Table 17 below, with percentages being weight percent based on the total weight of the composition.

Examples were produced using twin screw extrusion compounding. Temperatures for extrusion compounding ranged from 200-230° C. A melt was formed into strands, cooled, and pelletized.

TABLE 17

| | Cellulose Ester Degree of Substitution (Ds) | | | Biodegradable Polymer | | DSC values | | |
|---|---|---|---|---|---|---|---|---|
| Ex | Ds OH | Ds Ac | Ds Pr | Type | wt. % | Tg, 2nd heat, ° C. | Tm, 2nd heat, ° C. | Tc, cool, ° C. |
| 54 | | | | PBAT TH801K | 100 | −33.1 | 120 | 63 |
| 55 | 0.8 | 0.1 | 2.1 | PBAT TH801K | 80 | −31 | 114 | 33 |
| 56 | 0.4 | 0.1 | 2.5 | PBAT TH801K | 80 | −29 | 118 | 31 |
| 57 | 0.3 | 0.1 | 2.6 | PBAT TH801K | 80 | −29 | 120 | 32 |
| 58 | 0.5 | 2.5 | 0 | PBAT TH801K | 80 | −32.7 | 120.8 | 61.4 |

Ex 54-57 exhibit significantly lower crystallization temperature compared to control Ex 54, while example 58 exist similar thermal properties to control Ex 54.

Selected samples were then evaluated for homogeneity by AFM, as summarized in Table 18.

TABLE 18

| Ex | Miscibility (Yes/No) | Domain size (μm) |
|---|---|---|
| 54 | — | — |
| 55 | No | <0.5 |
| 58 | No | 4 |

Ex 55 is more miscible than Ex 58.

Ex 59-86

Tuning Tg for Optimal Process Temperature

Table 19 shows the glass transition temperatures of the samples measured by DSC. Biopolymers are effective in reducing Tg and bring the Tg of the blends to the optimal processing range as permitted by the polystyrene expansion foam equipment. Compatible blends refer to blends where a substantial Tg depression in the major CE phase was observed by introducing the polyesters; whereas incompatible blends refer to blends where there was negligible Tg depression in the major CE phase when the polyester was introduced. The compatible blends are advantaged to achieve uniform foaming compared to partially compatible and immiscible blends.

TABLE 19

CE and CE blends $T_g$s

| Ex | Sample | Composition | Tg (° C.) | Type of Blend |
|----|--------|-------------|-----------|---------------|
| 59 |  | CAP1 | 144 |  |
| 60 |  | CAP2 | 158 |  |
| 61 |  | CAP3 | 149.4 |  |
| 62 |  | PBS1 [BioPBS FD92 (PTT MCC)] | −44 |  |
| 63 |  | PCL [PCL Capa 6500 (Ingevity)] | −65 |  |
| 64 |  | PBS2 [BioPBS FZ91 (PTT MCC)] | −37 |  |
| 65 |  | PBAT [PBAT Ecoflex C1200 (BASF)] | −30 |  |
| 66 | A1 | 90/10 CAP1/PBS1 | 124 | Compatible |
| 67 | A2 | 80/20 CAP1/PBS1 | 91 | Compatible |
| 68 | A3 | 75/25 CAP1/PBS1 | 75 | Compatible |
| 69 | B1 | 90/10 CAP1/PCL | 123 | Compatible |
| 70 | B2 | 80/20 CAP1/PCL | 113 | Compatible |
| 71 | B3 | 75/25 CAP1/PCL | 105 | Compatible |
| 72 | B4 | 70/30 CAP1/PCL | 97 | Compatible |
| 73 | C1 | 90/10 CAP1/PBS2 | 118 | Compatible |
| 74 | C2 | 80/20 CAP1/PBS2 | 94 | Compatible |
| 75 | C3 | 75/25 CAP1/PBS2 | 82 | Compatible |
| 76 | D1 | 90/10 CAP1/PBAT | 131 | Compatible |
| 77 | D2 | 80/20 CAP1/PBAT | 111 | Compatible |
| 78 | D3 | 75/25 CAP1/PBAT | 107 | Compatible |
| 79 | D4 | 70/30 CAP1/PBAT | 104 | Compatible |
| 80 | E1 | 80/20 CAP2/PBS1 | −2, 112 | Compatible |

TABLE 19-continued

CE and CE blends $T_g$s

| Ex | Sample | Composition | Tg (° C.) | Type of Blend |
|----|--------|-------------|-----------|---------------|
| 81 | E2 | 70/30 CAP2/PBS1 | −5, 96 | Compatible |
| 82 | F1 | 80/20 CAP2/PCL | −60, 51, 158 | Partially compatible |
| 83 | G1 | 80/20 CAP2/PBS2 | −8, 120 | Compatible |
| 84 | G2 | 70/30 CAP2/PBS2 | −8, 98 | Compatible |
| 85 | H1 | 80/20 CAP2/PBAT | −29, 156 | Incompatible |
| 86 | I1 | 80/20 CAP2/PBS1 | −18, 53 | Compatible |

Synthesis of CAP2 and CAP3

Activated cellulose mixture [cellulose (82 g) and PrOH (63.6 g] was cooled to 15° C. in a vessel with overhead stirring. Following, a solution of sulfuric acid (2.8 g), $Ac_2O$ (45 g), and $Pr_2O$ (261.2 g) (acylation solution) cooled to 15° C. was added to the cooled activated cellulose mixture with stirring. The resulting reaction mixture was warmed to 23° C. and stirred at 23° C. for 60 min. Then the reaction mixture was heated to 63° C. over 45 min, at which point a soln of PrOH (144.9 g) and $H_2O$ (51.1 g) was added. The mixture was then stirred at 71° C. for 900 min. The mixture is treated with a solution of $Mg(OAc)_2 \cdot 4H_2O$ (5.29 g) in AcOH (84 g) and $H_2O$ (64.1 g) and the mixture was stirred for 30 min and cooled to rt. The mixture was filtered. The cellulose ester was precipitated from the filtrate with water and agitated in a commercial blender, and the cellulose ester was filtered, collected, the solids were washed with running water and dried in a vacuum oven set at 60° C. until dry to give the desired product.

Tables 20-22 provides a summary of the reagents and conditions used in the preparation of CAP2 and CAP3. Table 23 provides the characterizations for CAP2 and CAP3.

TABLE 20

Starting Reagents for CE Syntheses

| Cellulose Ester | Dry Cellulose (g) | Acid in Activate (g) | Free Acid (g) | $H_2SO_4$ (g) | $Ac_2O$ (g) | $Pr_2O$ (g) |
|-----------------|-------------------|----------------------|---------------|---------------|-------------|-------------|
| CAP2 | 82 | 59.2 PrOH | 72.0 PrOH, 5.1 AcOH | 2.8 |  | 318.5 |
| CAP3 | 82 | 63.6 PrOH | 63.6 PrOH, 20.1 AcOH | 2.8 | 45.0 | 261.2 |

TABLE 21

Composition of Finals and Neutralizations for CE Syntheses

| Cellulose Ester | A-Final 1 | A-Final 2 | Neutralization[b] |
|---|---|---|---|
| CAP2 | 144.9 g PrOH 51.1 g $H_2O$ | 226.0 g PrOH 79.7 g $H_2O$ | 7.35 $Mg(OAc)_2 \cdot 4H_2O$ |
| CAP3 | 144.9 g PrOH 51.1 g $H_2O$ | 226.0 g PrOH 79.7 g $H_2O$ | 5.29 $Mg(OAc)_2 \cdot 4H_2O$ |

[b]$Mg(OAc)_2$ was dissolved in 84.0 g AcOH and 64.1 g $H_2O$

TABLE 22

Temperature Conditions for CE Syntheses

| | Initial | | Room Temp Hold | | Ramp | | IV Break | | Hydrolysis | |
|---|---|---|---|---|---|---|---|---|---|---|
| Cellulose Ester | Temp (° C.) | Time (min) | Temp (° C.) | Time (min) | Temp (° C.) | Time (min) | Temp (° C.) | Time (min) | Temp (° C.) | |
| CAP2 | 15 | 60 | 23 | 45 | 63 | 30 | 63 | 930 | 71 | |
| CAP3 | 15 | 60 | 23 | 45 | 63 | 0 | 63 | 900 | 71 | |

TABLE 23

Composition by $^1H$ NMR and molecular weight determined against polystyrene standards.

| Cellulose Ester | DSAc | DSPr | Total DS | Mw |
|---|---|---|---|---|
| CAP2 | 0.02 | 2.14 | 2.16 | 26157 |
| CAP3 | 0.50 | 1.64 | 2.14 | 91755 |

Ex 59, 67 70, 74 and 78

Blowing Agent Absorption

In BA absorption study, the cellulose ester/biopolymer blend films with thickness of 5 mil were prepared by compression molding. The films were immersed in designated BA mixtures for various amount of time. For example, 95/5 isohexane/acetone denotes a BA mixture with 95 wt % isohexane and 5 wt % acetone. The weight of the film was measured before and after immersion in BA mixture. The wt % BA uptake was calculated with reference to the weight of dry film.

FIG. 1 presents the amount of BA mix absorbed by cellulose ester/biopolymer films as a function of time. In 95/5 isohexane/acetone (IH/A), 98/2 isohexane/ethanol (IH/EtOH), and 95/5 isohexane/ethyl formate (IH/EF) blends, the CAP1/biopolymer films showed faster BA mix uptake than CAP1 by itself, which suggested that the addition of biopolymers improved the compatibility between the polymer and the BA mix. or CAP1 is 1:1 blend of CAP-482-20 and CAP-482-0.5. The improved compatibility is beneficial for BA retention in the polymer during the foaming process, which is also supported by the BA desorption study.

Similarly, increasing BA uptake rate by the addition of biopolymers has also been observed for CAP2. CAP2 and the biopolymers used in this study are biodegradable polymers. CAP2/biopolymer blend formulations offered biodegradable options for foam articles.

Examples 87-108

Blowing Agent Desorption

In BA desorption study, the CE/biopolymer film with thickness of 5 mil were prepared by compression molding.

Figure 2:
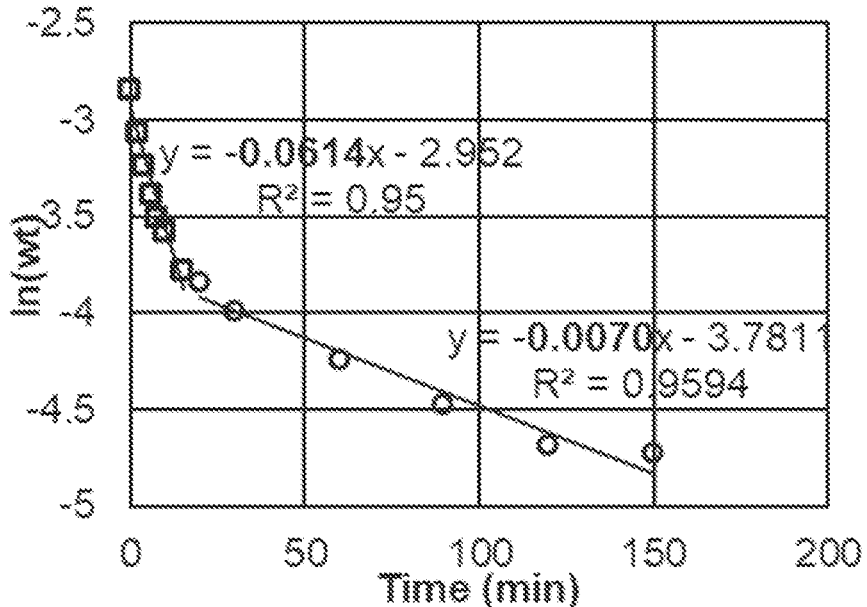
FIG. 2 depicts the desorption curve for CAP1 with 95/5 isohexane/ethanol as a blowing agent.

The films were immersed in designated BA mixture until the films absorbed approximately 6 wt % BA. This BA loading level has been shown to reliably produce good quality expansion foams. The weight of the film was then measured at room temperature over a period of time. The BA desorption curve is plotted as natural log of wt % BA absorbed by film as a function of desorption time. An example of a desorption curve is shown in FIG. 2.

The desorption curve was fitted by two slopes to best describe the two-stage desorption profile. The slope of the desorption curve (wt % BA coming out of a film over time) is a measurement of BA diffusion rate from the polymer or polymer blend film. The lower the slope value, the slower the diffusion rate and the better the BA retention by the polymer or polymer blend.

Slope 1 values were reported in Table 24 for each polymer blend and BA mix combination. The % reduction in slope 1 is calculated for CE/biopolymer blends with reference to the CE neat polymer. The BA desorption results showed that the addition of biopolymers led to significant improvement in BA retention in polymer, as evidenced by lower Slope 1 values for the CE/biopolymer blends compared to CE by itself. The CE/biopolymer blends showed up to 65% reduction in BA diffusion rate, which is beneficial for the foaming process.

It should be noted that the BA mix composition absorbed by the films differed from the BA mix composition in the liquid BA reservoir during immersion. The BA mix composition absorbed by the films were measured using gas chromatography. The results are presented in Table 24.

TABLE 24

Slope of desorption curve for CE and CE blends.

| Ex | Polymer | BA Composition | Slope | % Reduction |
|---|---|---|---|---|
| 87 | CAP1 | 95/5 IH/EtOH | 0.061 | NA |
| 88 | CAP1 | 98/2 IH/EtOH | 0.038 | NA |
| 89 | A2 | 98/2 IH/EtOH | 0.026 | 31% |
| 90 | B2 | 98/2 IH/EtOH | 0.033 | 12% |
| 91 | C2 | 98/2 IH/EtOH | 0.028 | 27% |
| 92 | D3 | 98/2 IH/EtOH | 0.024 | 38% |
| 93 | CAP1 | 95/5 IH/Acetone | 0.049 | NA |
| 94 | A2 | 95/5 IH/Acetone | 0.023 | 54% |
| 95 | B2 | 95/5 IH/Acetone | 0.044 | 10% |
| 96 | C2 | 95/5 IH/Acetone | 0.029 | 40% |
| 97 | D3 | 95/5 IH/Acetone | 0.025 | 48% |
| 98 | CAP1 | 98/2 IH/EF | 0.024 | NA |
| 99 | A2 | 98/2 IH/EF | 0.020 | 17% |
| 100 | B2 | 98/2 IH/EF | 0.050 | −110% |
| 101 | C2 | 98/2 IH/EF | 0.019 | 23% |
| 102 | D3 | 98/2 IH/EF | 0.017 | 30% |
| 103 | CAP2 | 98/2 IH/EtOH | 0.050 | NA |
| 104 | G1 | 98/2 IH/EtOH | 0.017 | 65% |

TABLE 24-continued

| | | Slope of desorption curve for CE and CE blends. | | |
|---|---|---|---|---|
| Ex | Polymer | BA Composition | Slope | % Reduction |
| 105 | E1 | 98/2 IH/EtOH | 0.018 | 64% |
| 106 | CAP2 | 95/5 IH/Acetone | 0.071 | NA |
| 107 | G1 | 95/5 IH/Acetone | 0.029 | 59% |
| 108 | E1 | 95/5 IH/Acetone | 0.035 | 50% |

Ex 109-118

Moisture Management

The moisture uptake was measured by thermogravimetric analysis using a water vapor sorption analyzer (TA Q5000SA). The samples were first equilibrated at 0% relative humidity (RH), 60° C. for 2 h and then held at 80% RH, 60° C. for 2 h. The high RH is to simulate the foaming process where steam is used as the heat source. The water absorbed by the sample was recorded. The results were shown in Table 25 below. The results showed that blending CE with biopolymers led to 12-24% reduction in water uptake by the polymer, which helped alleviate issues due to water plasticization as previously explained.

TABLE 25

| | | Water absorbed by CE and CE blends at 80% RH, 60° C. for 2 hours. | |
|---|---|---|---|
| Ex | Sample | % Water Absorbed | % Reduction |
| 109 | CAP1 | 2.5 | |
| 110 | A2 | 2 | 20% |
| 111 | B2 | 1.9 | 24% |
| 112 | C2 | 2.1 | 16% |
| 113 | D3 | 1.9 | 24% |
| 114 | CAP2 | 3.4 | |
| 115 | E1 | 3 | 12% |
| 116 | F1 | 3 | 12% |
| 117 | G1 | 2.6 | 24% |
| 118 | H1 | 2.8 | 18% |

FZ91 purchased from PTT MCC, or a polycaprolactone, CAPA 6500 purchased from Ingevity. Materials were compounded on a Leistritz 18 mm twin screw extruder having a 50:1 L/D at 180 to 200° C. and 400 to 500 rpms using a medium shear screw configuration. The formulations are shown in Table 26.

Table 27 shows the thermal and rheological properties of CAP/Biopolymer blends. The thermal transitions of the polymers were measured by DSC. The samples were heated from 30° C. to 220° C., back to 30° C., and to 220° C. at 20° C./min in nitrogen. The mid-point $T_g$ was measured on the second heating curve and reported in the table. The melt flow rate (MFR) of polymer blends were measured at 200° C. with a weight of 5 kg. The complex viscosities of the polymer blends were measured at 200° C. from 1 Hz to 400 Hz. The values of 1 Hz, 10 Hz, 100 Hz and 400 Hz are reported.

It should be noted that without the addition of biopolymer, CAP by itself as illustrated by comp Ex 119 will not be processable in conventional expansion foaming equipments which use pressurized steam as the main heating source. The pre-expansion and molding temperature typically is around 95 to 105° C. A Tg of 142° C. in comp Ex 119 is not ideal. The high melt viscosity will also make foaming challenging. Therefore, the addition of biopolymers to depress Tg and reduce melt viscosity as shown by increased MFR and reduced complex viscosity is crucial to improve the processability of CAPs.

TABLE 26

| | CAP/biopolymer resin blend formulations for expansion foaming | | | | | |
|---|---|---|---|---|---|---|
| Ex | CAP-482-20 (wt %) | CAP-482-0.5 (wt %) | PBS FZ91 (wt %) | CAPA 6500 (wt %) | Vikoflex 7170 (wt %) | ZSC Talc (wt %) |
| Comp 119 | 47.5 | 47.5 | 0 | 0 | 1 | 4 |
| 120 | 38.75 | 38.75 | 17.5 | 0 | 1 | 4 |
| 121 | 18.75 | 58.75 | 17.5 | 0 | 1 | 4 |
| 122 | 40 | 40 | 0 | 15 | 1 | 4 |

TABLE 27

| | Properties of CAP/biopolymer resin blend formulations for expansion foaming | | | | | |
|---|---|---|---|---|---|---|
| Ex | Tg (° C.) | MFR (g/10 min) | Viscosity @ 1 Hz (Poise) | Viscosity @10 Hz (Poise) | Viscosity @ 100 Hz (Poise) | Viscosity @ 400 Hz Poise) |
| Comp 119 | 142.4 | 1.1 | 944636 | 189179 | 33129 | 13171 |
| 120 | 99.0 | 7.9 | 194696 | 69839 | 17396 | 6632 |
| 121 | 98.5 | 8.9 | 200859 | 70621 | 17623 | 6812 |
| 122 | 105.0 | 17.3 | 104633 | 46520 | 13987 | 5797 |

Ex 119-122: Formulation of CAP/Biopolymer Compositions for Expansion Foaming

Samples were formulated at Eastman to include cellulose esters, a biodegradable polymer as polymeric plasticizer, a stabilizer and a nucleating agent. The cellulose ester is CAP-482-20 and CAP-482-0.5, which are cellulose acetate propionate with a high and low molecular weight. The stabilizer was Vikoflex 7170. The nucleating agent was Mistron ZSC talc. The biodegradable polymer in these examples were either a polybutylene succinate, BioPBS Examples 123-125: Making of Beads Containing Blowing Agents Compounded materials were the reprocessed at Gala in Germany on a ZSK 26 extruder, having a Extrex 36-5 gear pump and a MAP 5 Pelletizer. The blowing agent was metered into the extruder about ⅔ the way down the barrel using a JASCO PU-2087 Plus metering pump. For all samples, a target of 6% blowing agents was targeted in the polymer formulation. Blowing agent type 1 is a non-polar blowing agent such as isohexane, while blowing agent type 2 is a polar blowing agent such as ethyl formate or ethanol to promote compatibility between blowing agents and resins.

Bead formulation details including blowing agent type and content can be viewed in Table 28 below. Bead processing conditions for processing rate, processing temperature, processing speeds, can be observed in Table 29.

TABLE 28

Bead Formulation

| Ex | Resin | BA 1 Type | BA 1 Content wt % | BA 2 Type | BA 2 Content (wt %) |
|---|---|---|---|---|---|
| 123 | Ex 120 | Isohexane | 4.2 | Ethyl formate | 1.8 |
| 124 | Ex 121 | Isohexane | 4.2 | Ethyl formate | 1.8 |
| 125 | Ex 122 | Isohexane | 4.2 | Ethanol | 1.2 |

TABLE 29

Bead Formulation Processing Conditions

| Example | 123 | 124 | 125 |
|---|---|---|---|
| Temperature Zone 1, ° C. | | | |
| Temperature Zone 2, ° C. | 90 | 90 | 90 |
| Temperature Zone 3, ° C. | 120 | 120 | 120 |
| Temperature Zone 4, ° C. | 180 | 180 | 170 |
| Temperature Zone 5, ° C. | 180 | 180 | 180 |
| Temperature Zone 6, ° C. | 180 | 180 | 180 |
| Temperature Zone 7, ° C. | 180 | 180 | 175 |
| Temperature Zone 8, ° C. | 175 | 175 | 170 |
| Temperature Zone 9, ° C. | 175 | 175 | 170 |
| Temperature Zone 10, ° C. | 170 | 170 | 165 |
| Die temperature | 299 | 303 | 305 |
| Extruder speed, rpm | 240 | 240 | 240 |
| Extruder load, % | 54 | 49 | 51 |
| feed rate, kg/hr | 24.0 | 24.0 | 24.0 |
| Melt Temperature, ° C. | 192 | 189 | 189 |
| Water pressure, bar | 6.0 | 6.0 | 7.0 |
| Water temperature, ° C. | 40 | 40 | 35 |
| Cutter speed, rpm | 5000 | 5000 | 5000 |
| Cutter load, % | 57 | 73 | 80 |
| Blowing agent input, wt % | 6.6 | 6.7 | 6.2 |
| Blowing agent pump rate, mL/min | 36.0 | 36.0 | 35.0 |
| Blowing agent pump pressure, bar | 193 | 220 | 156 |

Ex 126-138: Pre-Expansion of Foamable CAP/Biopolymer Beads

The materials were pre-expanded and molded at Erlenbach using a EMbead ED2-HP pre-exander and EHVC-E 870/670 molding machine. The prexpansion density and process conditions are listed in Table 27. The density was determined by weighing the material that filled a 1 liter volume.

Pre-expanded beads with density ranging from 110 g/L to as low as 39 g/L can be produced by varying steam temperature (as controlled by steam pressure) and steam time. At low steam pressure, beads did not have sufficient time and heat to reach maximum expansion and the bead density remained high such as in comparative Ex 126, 131, and 135. With increasing steam pressure, bead density reduces. If steam pressure is too high, the beads go past the maximum achievable expansion and bead shrinkage is observed, as shown by comparative Ex 130 and 134.

TABLE 30

Pre-expansion conditions and bead density

| Ex | Unexpanded bead example | Steam Pressure (Bar) | Steam Time (sec) | Bead Density (g/L) |
|---|---|---|---|---|
| Comp126 | 5 | 0.23 | 30 | 67.6 |
| 127 | 5 | 0.4 | 30 | 54.7 |
| 128 | 5 | 0.5 | 30 | 48 |
| 129 | 5 | 0.6 | 30 | 39.4 |
| Comp 130 | 5 | 0.7 | 30 | 43.5 |
| Comp 131 | 6 | 0.3 | 30 | 51.3 |
| 132 | 6 | 0.45 | 30 | 39.8 |
| 133 | 6 | 0.5 | 30 | 40.2 |
| Comp 134 | 6 | 0.6 | 30 | 43.4 |
| Comp 135 | 7 | 0.4 | 30 | 110 |
| 136 | 7 | 0.6 | 30 | 70 |
| 137 | 7 | 0.7 | 30 | 61 |
| 138 | 7 | 0.8 | 30 | 54.1 |

Ex 139-144: CAP/Biopolymer Board Molding

The molding conditions are listed in Table 31. The parts are heated with steam through the thickness using cross steam and the faces are heated with autoclave steam, the parts are cooled by spraying water on the surface as well pulling vacuum to hold the part against the mold. P and T stands for pressure and time.

The resulting board dimensions, density and shrinkage are shown in Table 32. Select molding conditions led to CAP/biopolymer boards with minimal shrinkage and warpage as shown by the examples while some experienced significant shrinkage. Boards with density in the range of 50-70 g/L with minimal shrinkage and warpage was achieved. Ex 140, 142, 143, and 144 yielded boards with no observable shrinkage and warpage.

TABLE 31

Molding conditions

| Ex | Pre-Expanded Bead Ex | Cross-steam Fixed P (bar) | Cross-steam Fixed T (sec) | Cross-steam Mobile P (bar) | Cross-steam Mobile T (sec) | Autoclave Fixed P (bar) | Autoclave Fixed T (sec) | Autoclave Mobile P (bar) | Autoclave Mobile T (sec) | Bottom Steam CS P (bar) | Bottom Steam CS T (sec) | Cooling (spray/spray/vacuum) T (sec) |
|---|---|---|---|---|---|---|---|---|---|---|---|---|
| 139 | 11 | 0.8 | 5 | 0.8 | 7 | 1.5 | 7 | 1.8 | 9 | 0.8 | 7 | 15/25/120 |
| 140 | 11 | 0.5 | 5 | 0.5 | 7 | 2 | 9 | 2 | 7 | 0.5 | 7 | 15/25/60 |
| 141 | 15 | 0.8 | 5 | 0.8 | 7 | 2 | 9 | 2 | 7 | 0.8 | 7 | 15/25/40 |

TABLE 31-continued

| | | Molding conditions | | | | | | | | | | |
| | Pre-Expanded | Cross-steam Fixed | | Cross-steam Mobile | | Autoclave Fixed | | Autoclave Mobile | | Bottom Steam CS | | Cooling (spray/spray/vacuum) |
| Ex | Bead Ex | P (bar) | T (sec) | P (bar) | T (sec) | P (bar) | T (sec) | P (bar) | T (sec) | P (bar) | T (sec) | T (sec) |
|---|---|---|---|---|---|---|---|---|---|---|---|---|
| 142 | 15 | 0.8 | 5 | 0.8 | 7 | 2 | 9 | 2 | 7 | 0.8 | 7 | 15/25/10 |
| 143 | 20 | 0.8 | 5 | 0.8 | 7 | 2.3 | 9 | 2.3 | 7 | 0.8 | 7 | 15/25/50 |
| 144 | 20 | 0.8 | 5 | 0.8 | 7 | 2.3 | 9 | 2.3 | 7 | 0.8 | 7 | 15/25/50 |

TABLE 32

| | Board dimensions, density, and shrinkage | | | | | | | |
| Ex | Pre-Expanded Bead Ex Mold | Length (mm) 810 | Width (mm) 610 | Thickness (mm) 50 | Volume (m³) | Weight (kg) | Density (g/L) | Shrinkage (%) |
|---|---|---|---|---|---|---|---|---|
| Comp 139 | 11 | 735 | 554 | 45 | 0.018 | 1.377 | 75.1 | −26% |
| 140 | 11 | 766 | 570 | 45 | 0.020 | 1.348 | 68.6 | 0% |
| Comp 141 | 15 | 777 | 580 | 45 | 0.020 | 1.367 | 67.4 | −48% |
| 142 | 15 | 788 | 590 | 48 | 0.022 | 1.564 | 70.1 | −7% |
| 143 | 20 | 812 | 610 | 50 | 0.025 | 1.408 | 56.9 | 3% |
| 144 | 20 | 804 | 607 | 50 | 0.024 | 1.405 | 57.6 | 3% |

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A biodegradable composition, wherein the composition comprises:

(a) a cellulose ester which is a cellulose acetate propionate ("CAP"); and (b) a biodegradable polymer which is a polyester, wherein the polyester is chosen from poly(butylene succinate) ("PBS"), poly(butylene succinate adipate) ("PBSA"), polycaprolactone ("PCL"), poly(butylene adipate terephthalate) ("PBAT"), polylactic acid ("PLA") or combinations thereof, wherein the CAP has an average degree of substitution for hydroxyl substituents that is from 0.3 to 1.2, an average degree of substitution for the acetyl substituents ("$DS_{Ac}$") that is from 0 to 0.5, an average degree of substitution for the propionyl substituents ("$DS_{Pr}$") that is from 1.3 to 2.5, and a ball drop viscosity of from 0.1 to 30 seconds as measured according to ASTM D-1343, wherein the CAP is present at from 1 wt % to 34 wt % based on the total weight of the composition, wherein the composition has a glass transition temperature ("$T_g$") of from −60 to −10° C., a melting temperature ("$T_m$") of from 60 to 130° C., a crystallization temperature ("$T_C$") of from 20 to 85° C., and a viscosity reduction of at least 20° C. measured at 180 to 230° C. as compared to the polyester.

2. The biodegradable composition of claim 1, wherein the CAP has a ball drop viscosity of from 0.1 to 0.4 second as measured according to ASTM D-1343.

3. The biodegradable composition of claim 1, wherein the biodegradable composition is homogeneous.

4. The biodegradable composition of claim 1, wherein the CAP is present at from 1 wt % to 18 wt %, based on the total weight of the CAP and the biodegradable polymer.

5. The biodegradable composition of claim 1, wherein the CAP is present at from 18 wt % to 34 wt % %, based on the total weight of the CAP and the biodegradable polymer.

6. The biodegradable composition of claim 1, wherein the polyester is PBS.

7. The biodegradable composition of claim 1, wherein the polyester is PBSA.

8. The biodegradable composition of claim 1, wherein the polyester is PCL.

9. The biodegradable composition of claim 1, wherein the polyester is PBAT.

10. The biodegradable composition of claim 1, wherein the polyester is PLA.

11. A film comprising the composition of claim 1.

12. The film of claim 11, wherein the film is from 12 to 1524 micrometers in thickness.

13. A drinking straw comprising the composition of claim 1.

14. A fiber comprising the composition of claim 1.

15. A molded object comprising the composition of claim 1.

16. A paper or paperboard comprising a coating on a paper or paperboard, wherein the coating comprises the composition of claim 1.

17. The paper or paperboard of claim 16, wherein the coating is from 10 to 75 micrometers in thickness.

18. A paper cup formed from the paper or paperboard of claim 16.

19. A coated article comprising a substrate comprising a surface and a layer comprising the composition of claim 1 on said surface.

\* \* \* \* \*